(12) United States Patent
Deniau et al.

(10) Patent No.: US 11,225,110 B2
(45) Date of Patent: Jan. 18, 2022

(54) SYSTEM AND METHOD FOR MAKING PROTOCOL CHANGES TO A TIRE PRESSURE MONITORING SENSOR

(71) Applicant: Continental Automotive Systems, Inc., Auburn Hills, MI (US)

(72) Inventors: Jean-Christophe Deniau, Fenton, MI (US); Alexander Fink, Oakland Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 97 days.

(21) Appl. No.: 16/716,610

(22) Filed: Dec. 17, 2019

(65) Prior Publication Data

US 2021/0178839 A1    Jun. 17, 2021

(51) Int. Cl.
    *B60C 23/04*      (2006.01)
    *B60C 23/02*      (2006.01)
    *B60C 23/00*      (2006.01)

(52) U.S. Cl.
    CPC ........ *B60C 23/0462* (2013.01); *B60C 23/002* (2013.01); *B60C 23/044* (2013.01); *B60C 23/0427* (2013.01); *B60C 23/0486* (2013.01)

(58) Field of Classification Search
CPC .. G01M 17/02; G01M 17/021; G01M 17/022; G01M 17/027; G01M 17/025; G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332;

(Continued)

(56) References Cited

U.S. PATENT DOCUMENTS

2013/0038440 A1 *    2/2013    Deniau ............... B60C 23/0462
                                                                                                                             340/447
2013/0038441 A1 *    2/2013    Deniau ............... B60C 23/0462
                                                                                                                             340/447

(Continued)

*Primary Examiner* — Andre J Allen

(57) ABSTRACT

Received acceleration or motion information are analyzed and when the analysis of this information indicates that motion or acceleration is detected, received burst patterns from the other sensors are analyzed. Based upon analyzing the detected burst patterns from the other sensors, a first burst pattern is selectively altered to transmit according to a single communication format, the single format being for a single vehicle manufacturer.

20 Claims, 23 Drawing Sheets

(58) Field of Classification Search
CPC ....... B60C 11/24; B60C 13/001; B60C 13/02;
B60C 15/0036; B60C 17/02; B60C
2009/0071; B60C 2009/2022; B60C
2200/02; B60C 2200/06; B60C 2200/065;
B60C 23/00; B60C 23/001; B60C 23/003;
B60C 23/007; B60C 23/008; B60C
23/0413; B60C 23/0427; B60C 23/0447;
B60C 23/0454; B60C 23/0457; B60C
23/0462; B60C 23/0471; B60C 23/0472;
B60C 23/0476; B60C 23/0479; B60C
23/0483; B60C 23/0484; B60C 23/065;
B60C 23/066; B60C 23/10; B60C
25/0548; B60C 25/056; B60C 25/132;
B60C 25/138; B60C 29/005; B60C 9/005;
B60C 9/18; B60C 9/1807; B60C 9/20;
B60C 9/28
USPC .................................................. 73/146–146.8
See application file for complete search history.

(56) References Cited

U.S. PATENT DOCUMENTS

2014/0002258 A1* 1/2014 Chen .................... B60C 23/0462
340/447
2015/0042465 A1* 2/2015 Deniau ............... B60C 23/0455
340/447
2016/0059647 A1* 3/2016 Deniau ............... B60C 23/0461
340/447
2017/0036499 A1* 2/2017 McIntyre ............ B60C 23/0442

* cited by examiner

US 11,225,110 B2

SYSTEM AND METHOD FOR MAKING PROTOCOL CHANGES TO A TIRE PRESSURE MONITORING SENSOR

TECHNICAL FIELD

This disclosure relates to tire pressure monitoring (TPM) sensors, and their usage and configuration.

BACKGROUND

The pressure and other operating parameters of tires are important concerns when operating a vehicle. Not only can incorrect tire pressure (or the incorrect setting of some other tire parameter) lead to inefficient vehicle operation (e.g., the waste of fuel and other problems leading to higher operating costs), but too low a tire pressure (or an inadequate value for some other tire parameter) can lead to safety problems such as accidents. It is difficult and sometimes time-consuming for users to manually measure tire pressure (or other parameters) with a pressure gauge (or other instruments). Consequently, automatic tire pressure monitoring systems have been devised and these systems free the user from manually making tire measurements.

An automatic tire pressure monitoring device typically mounts to a wheel within the tire and wirelessly transmits information indicative of conditions within the tire. The transmissions and the order of information are typically defined by a protocol corresponding to a receiver within the vehicle. Once the receiver receives the information, the information can be processed and presented to a user. For instance, a user can be warned when the pressure in their tires is too high or too low and thus avoid safety problems. Each automobile or vehicle manufacturer typically has a unique, preferred, and pre-defined protocol to meet application specific needs and applications.

BRIEF DESCRIPTION OF THE DRAWINGS

For a more complete understanding of the disclosure, reference should be made to the following detailed description and accompanying drawings wherein.

Figure 1:
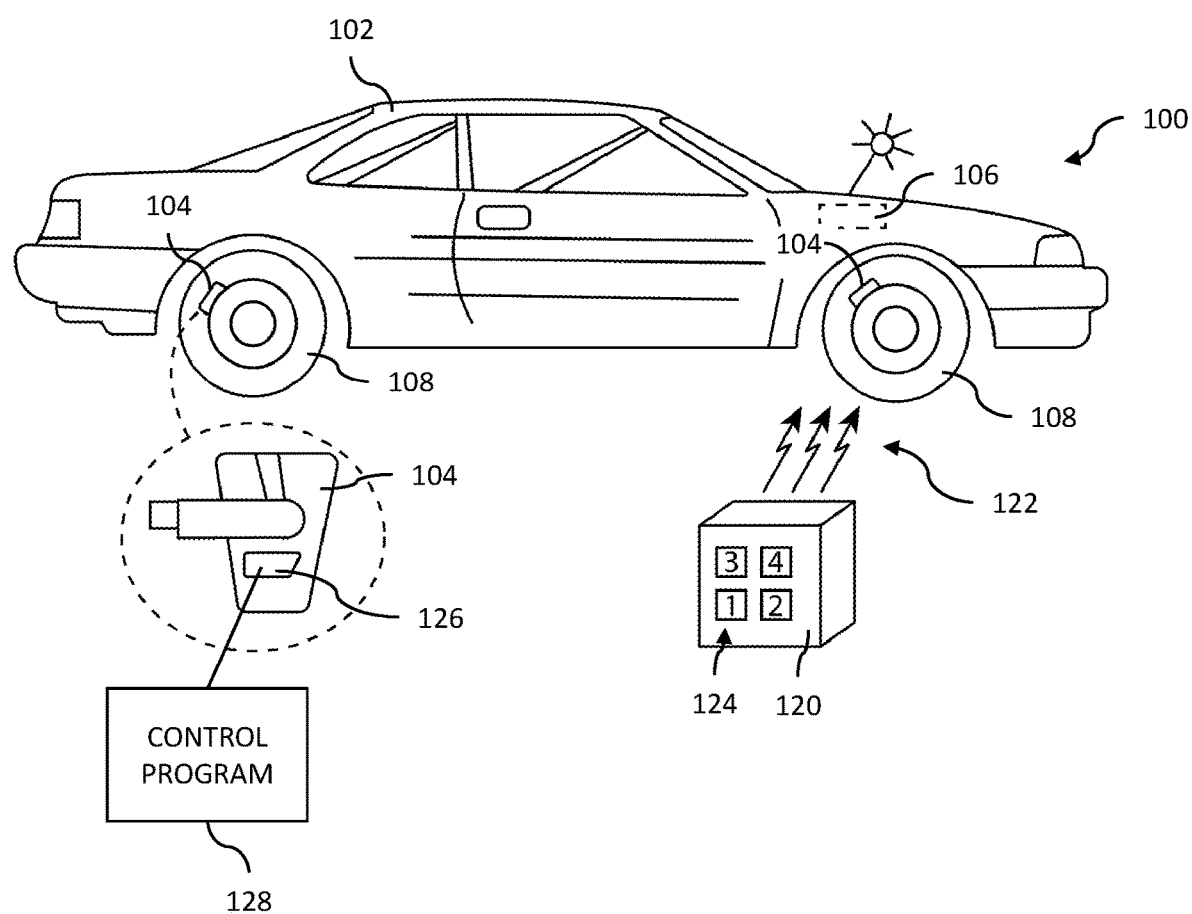
FIG. 1 comprises a diagram of a system as configured in accordance with various embodiments of these teachings.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

In aspects, tire pressure monitoring (TPM) sensors and/or other devices learn from transmissions (e.g., the information included or embedded in the transmission) that are made from other sensors and the information received from the other sensors to identify a single protocol (or in some cases, to reduce the number of protocols used). The information is used by the sensor to select a transmission protocol and make transmissions according to this protocol. The approaches described herein are efficient and cost effective to implement, and save power at the sensor since the sensor only transmits information using a single protocol (or reduced set of protocols).

In many of these embodiments, a tire pressure monitoring (TPM) sensor includes a sensing device, a transmission buffer, a transmitter circuit, a receiver circuit, and a control circuit. The sensing device is configured to sense pressure information of a tire. The transmission buffer is coupled to the sensing device. The transmission buffer is utilized to store the sensed pressure information. The transmitter circuit is coupled to the transmission buffer.

The receiver circuit is configured to receive acceleration or motion information from an accelerometer. The receiver circuit is also configured to receive sensed burst patterns (or other transmissions) from other tire pressure monitoring sensors.

The control circuit is coupled to the pressure sensing device, the transceiver circuit, and the receiver circuit. The control circuit is configured to cause the transmission of a first burst pattern from the transmission buffer to an external receiver device via the transmitter circuit. The first burst pattern comprises the sensed tire pressure information according to a plurality of communication formats for a plurality of vehicle manufacturers.

The control circuit is further configured to perform a first analysis on the received acceleration or motion information and when the first analysis indicates that motion or acceleration is detected, perform a second analysis on the detected burst patterns from the other sensors that are received by the receiver circuit.

The control circuit is further configured to, based upon the second analysis of the detected burst patterns from the other sensors, selectively alter the first burst pattern to a single communication format for a single vehicle manufacturer, and cause the transmitter circuit to transmit the pressure information in the transmission buffer according to the single communication format.

In aspects, the pressure information is the measured pressure of the tire. In other aspects, the sensing device further detects temperature information concerning the tire. In yet other examples, tread wear of the tire is detected. Other examples are possible.

In other examples, the detected burst patterns from the other sensors comprise three burst patterns (for each of the three other sensors at the vehicle). In some aspects, each of the three burst patterns is of the same communication format (e.g., the same protocol).

In yet other examples, the detected burst patterns from the other sensors comprise one burst pattern of a single communication format (from a second sensor) and two burst patterns each having multiple communication formats (one of the patterns from a third sensor and the other from a fourth sensor).

In other aspects, the detected burst patterns include at least one burst pattern having the single communication format, and the alteration of the first burst pattern is made based upon a probability that the single communication format is correct. The probability may be calculated or inferred, for example, based upon factors such as the number of single protocol transmissions that are detected.

In still other examples, the sensor is moved from the tire of a first vehicle to a tire of a second vehicle and the detected burst patterns from the other sensors are from sensors on the second vehicle. Consequently and according to these approaches, a sensor can be moved between vehicles and can determine a single protocol (or a reduced number of protocols) to transmit in the new vehicle.

In others of these embodiments, an approach of operating a tire pressure monitoring (TPM) sensor is provided. Pressure information of a tire is sensed at a sensing device. The sensed pressure information is stored in transmission buffer.

At a receiver circuit, acceleration or motion information is received from an accelerometer and sensed burst patterns are received from other tire pressure monitoring sensors.

A control circuit causes transmission of a first burst pattern from the transmission buffer to an external receiver device via the transmitter circuit. The first burst pattern comprises the sensed tire pressure information according to a plurality of communication formats for a plurality of vehicle (e.g., automobile) manufacturers. The control circuit analyzes the received acceleration or motion information and when the analysis of this information indicates that motion or acceleration is detected, the control circuit analyzes the detected burst patterns from the other sensors that are received by the receiver circuit. Based upon analyzing the detected burst patterns from the other sensors, the control circuit selectively alters the first burst pattern to a single communication format for a single vehicle manufacturer, and causes the transmitter circuit to transmit the pressure information in the transmission buffer according to the single communication format.

In others of these embodiments, a computer readable non-transitory medium includes a computer readable program code embodied therein. The computer readable program code is adapted to be executed to implement a method of operating a tire pressure monitoring system. The method comprises: sensing pressure information of a tire at a sensing device; storing the sensed pressure information in transmission buffer; at a receiver circuit, receiving acceleration or motion information from an accelerometer and receiving sensed burst patterns from other tire pressure monitoring sensors; at a control circuit, causing transmission of a first burst pattern from the transmission buffer to an external receiver device via the transmitter circuit, the first burst pattern comprising the sensed tire pressure information according to a plurality of communication formats for a plurality of vehicle manufacturers; at the control circuit, analyzing the received acceleration or motion information and when the analyzing indicates that no motion is detected, analyzing the detected burst patterns from the other sensors that are received by the receiver circuit; at the control circuit and based upon an analysis of the detected burst patterns from the other sensors, selectively altering the first burst pattern to a single communication format for a single vehicle manufacturer, and causing the transmitter circuit to transmit the pressure information in the transmission buffer according to the single communication format.

In other aspects, approaches are provided where a tire pressure sensor transmits an identifier to a receiver device in a vehicle. In one example, the identifier is an address. The receiver device receives the identifier and determines the functionality associated with the identifier. For example, the identifier is the address of a sensor and the functionality defines operations, settings, and/or capabilities of the sensor. Responsively, the functionality is sent to the sensor by the receiver device in the form of computer code, computer instructions, settings or other information that enable or implement the functionality. In other words, the computer code, instructions, settings or other information cause, change, or alter operation of the sensor to perform or conform operation to the functionality.

In others of these embodiments, a tire pressure monitoring (TPM) sensor includes a pressure sensing device, a transmission buffer, a transmitter circuit, a control circuit, and a receiver circuit. The pressure sensing device is configured to sense pressure information of a tire.

The transmission buffer is coupled to the sensing device. The transmission buffer is utilized to store the sensed pressure information and an identifier that uniquely identifies the TPM sensor. The transmitter circuit is coupled to the transmission buffer.

The control circuit is coupled to the pressure sensing device and the transmitter circuit. The control circuit is configured to cause the transmitter circuit to transmit the identifier from the transmission buffer to an external receiver device. The external receiver device is configured to receive the identifier and to determine sensor functionality information associated with the identifier. The external receiver device is configured to transmit the sensor functionality information to the TPM sensor.

The receiver circuit is coupled to the control circuit and is configured to receive the sensor functionality information. The control circuit is configured to configure the operation of the TPM sensor according to the senor functionality information.

In aspects, the sensor functionality information defines a single protocol that is to be used by the TPM sensor for transmissions of the sensed pressure information. In examples, the control circuit causes the transmitter circuit to transmit the sensed pressure information from the transmission buffer according to the single protocol.

In other examples, the sensor functionality information relates to non-transmission-protocol functionality associated with the TPM sensor. In still other aspects, the sensor functionality information relates to updates to the functionality of the TPM sensor. For example, updates can first be loaded to the receiver device and then pushed out, e.g., periodically, to the sensors. In yet other examples, the sensor functionality information comprises computer code that implements the functionality. In some other examples, the sensor functionality information comprises electronic instructions.

In others of these embodiments, approaches for operating a tire pressure monitoring (TPM) sensor are provided. Pressure information of a tire is sensed at a pressure sensing device. The sensed pressure information and an identifier that uniquely identifies the TPM sensor are stored at a transmission buffer.

A control circuit of the sensor causes a transmitter circuit to transmit the identifier from the transmission buffer to an external receiver device. The external receiver device is configured to receive the identifier and determine sensor functionality information associated with the identifier. The external receiver device is configured to subsequently transmit the sensor functionality information to the TPM sensor.

The sensor functionality information is received at a receiver circuit of the sensor. The control circuit of the sensor is configured to configure the operation of the TPM sensor according to the received senor functionality information.

In still others of these embodiments, a computer readable non-transitory medium has a computer readable program code embodied therein. The computer readable program code is adapted to be executed and to implement a method of operating a tire pressure monitoring system. The method includes sensing pressure information of a tire at a pressure sensing device and storing the sensed pressure information and an identifier that uniquely identifies the TPM sensor at a transmission buffer. The method also includes, at a control circuit of the sensor, causing a transmitter circuit to transmit the identifier from the transmission buffer to an external receiver device. The external receiver device is configured to receive the identifier and determine sensor functionality information associated with the identifier. The external receiver device is configured to transmit the sensor functionality information to the TPM sensor. The method further includes, at a receiver circuit of the sensor, receiving the sensor functionality information. The control circuit is configured to configure the operation of the TPM sensor according to the received senor functionality information.

In other aspects, approaches are provided where a tire pressure monitoring sensor receives an identifier from an external receiver device, and then compares the identifier to ranges of identifiers. Each of the ranges represents a different vehicle manufacturer. Once the vehicle manufacturer is identified, the sensor is configured according to the identity of the manufacturer (e.g., by selecting a transmission protocol associated with the manufacturer or setting other functionality of the sensor according to the manufacturer).

In many of these embodiments, a tire pressure monitoring (TPM) sensor includes a pressure sensing device, a memory storage device, a transmission buffer, and transmitter circuit, a receiver circuit, and a control circuit.

The pressure sensing device is configured to sense pressure information of a tire. The memory storage device includes a mapping. The mapping comprises a plurality of identifier ranges being programmatically mapped to a plurality of protocols. Each of the protocols is associated with an automobile manufacturer.

The transmission buffer is coupled to the sensing device and is utilized to store the sensed pressure information. The transmitter circuit is coupled to the transmission buffer.

The receiver circuit is configured to receive a first identifier. The first identifier is transmitted from an external receiver device disposed in the vehicle and not in the tires of the vehicle. The first identifier identifies the manufacturer of the vehicle in which the external receiver device and the TPM sensor are located.

The control circuit is coupled to the pressure sensing device, the memory storage device, the transmitter circuit, and the receiver circuit. The control circuit is configured to obtain the manufacturer of the vehicle in which the external receiver device and the TPM sensor are located by applying the received first identifier to the stored mapping. The control circuit configures the operation of the TPM sensor according to the determined manufacturer of the vehicle.

In aspects, the control circuit configures operation of the TPM sensor by determining a transmission protocol. In other aspects, the control circuit causes the transmission of a burst pattern from the transmission buffer to the external receiver device via the transmitter circuit. The burst pattern comprises the sensed tire pressure information, according to the determined transmission protocol.

In other examples, the control circuit configures operation of the TPM sensor by modifying the functionality of the TPM sensor.

In still other examples, the identifier is a media access control (MAC) address.

In yet other examples, the control circuit determines a certainty that the received first identifier correctly identifies the vehicle in which the TPM sensor is disposed. In aspects, the receiver circuit is configured to receive a second identifier from a wireless device and wherein the control circuit determines the certainty using the first identifier and the second identifier.

In still others of these embodiments, the tire pressure of a tire is sensed using a pressure sensing device that is configured to sense pressure information of a tire. A mapping is stored in a memory storage device a mapping, the mapping comprises a plurality of identifier ranges being programmatically mapped to a plurality of protocols and each of the protocols is associated with an automobile manufacturer.

The sensed pressure information is stored in a transmission buffer. A first identifier is received at a receiver circuit. The first identifier is transmitted from an external receiver device disposed in the vehicle and not in the tires of the vehicle. The first identifier identifies the manufacturer of the vehicle in which the external receiver device and the TPM sensor are located.

At a control circuit, the manufacturer of the vehicle in which the external receiver device and the TPM sensor are located is obtained by applying the received first identifier to the stored mapping. At the control circuit, the operation of the TPM sensor is configured according to the determined manufacturer of the vehicle.

In others of these embodiments, a computer readable non-transitory medium has a computer readable program code embodied therein. The computer readable program code is adapted to be executed to implement a method of operating a tire pressure monitoring system. The method includes sensing the tire pressure of a tire using a pressure sensing device that is configured to sense pressure information of a tire; storing in a memory storage device a mapping, the mapping comprising a plurality of identifier ranges being programmatically mapped to a plurality of protocols, each of the protocols being associated with an automobile manufacturer; storing the sensed pressure information in a transmission buffer; receiving a first identifier at a receiver circuit, the first identifier being transmitted from an external receiver device disposed in the vehicle and not in the tires of the vehicle, the first identifier identifying the manufacturer of the vehicle in which the external receiver device and the TPM sensor are located; at a control circuit, obtaining the manufacturer of the vehicle in which the external receiver device and the TPM sensor are located by applying the received first identifier to the stored mapping; at the control circuit, configuring the operation of the TPM sensor according to the determined manufacturer of the vehicle.

In other aspects, approaches are provided where information from external sources is received at a tire pressure monitoring (TPM) sensor. The external sources are transmission sources outside the housing of the TPM sensor and can be located within the vehicle where the sensor is deployed and/or external to the vehicle. Based upon this information, the functionality of the sensor is changed. The change in functionality may include the number and/or identity of protocols transmitted by the sensor, how the sensor operates, or other operational functionality of the sensor. The change in functionality to the sensor may, in examples, rely upon further external information, instructions, data, or computer code transmitted to and received by the sensor. Alternatively, the sensor itself may internally be programmed or include all information, instructions, data, or computer code needed to effect changes. In yet other examples, a combination of external and internal information, instructions, data, or computer code is used to effect changes to the functionality of the sensor.

In others of these embodiments, a tire pressure monitoring (TPM) sensor includes a pressure sensing device, a transmission buffer, a transmitter circuit, a receiver circuit, and a control circuit. The pressure sensing device is configured to sense pressure information of a tire. The transmission buffer is coupled to the sensing device, and is utilized to store the sensed pressure information.

The transmitter circuit is coupled to the transmission buffer. The receiver circuit is configured to receive external condition information.

The control circuit is coupled to the pressure sensing device, the receiver circuit, and the transmitter circuit. The control circuit is configured to modify functionality of the sensor according to the received external condition information. The control circuit is configured to transmit the sensed pressure information from the transmission buffer according to one or more protocols. Each of the one or more protocols is associated with a vehicle manufacturer.

In aspects, the functionality of the sensor comprises the timing of transmissions, the power used in transmissions, and the one or more protocols used to make transmissions. In other examples, the external condition information comprises a geographic location, a government regulation, a legal jurisdiction, or a weather condition. Other examples are possible.

In other aspects, the receiver circuit comprises a GPS receiver and the information received by the sensor is GPS coordinate position information. Other examples are possible.

In other examples, a change in functionality of the sensor is initiated by an external receiver device or central controller after detecting a location change of the sensor. For example, the sensor may be detected or determined by a GPS tracking service to have moved from one jurisdiction (e.g., country) to another jurisdiction (e.g., country). In still other examples, a change in functionality of the sensor is initiated by the sensor where the sensor itself performs periodic checks for the external condition information. For example, the sensor may send period requests to external devices requesting information (e.g., location information) or requesting to be information if a functionality-changing event (e.g., the vehicle the sensor is located moves from one jurisdiction to another jurisdiction).

In other aspects, external condition information is received at other vehicle instruments and used to alter the functionality of these instruments. For example, a speedometer or odometer may change from units of miles-per-hour (or miles) to kilometers-per-hour (or kilometers). Other examples are possible. In some examples, the TPM sensor acts as a master device and controls the functionality of the other vehicle instruments. In other examples, the other vehicle instruments directly receive the external information and make their own determinations concerning this information.

As mentioned and in some examples, configuration information that changes the functionality is sent to the sensor from an external source. The configuration information may be the code itself or instructions that cause code at the sensor to operate or both. In still other examples, all hardware or software functionality already resides at the sensor and the external information serves as a trigger to activate this functionality.

In others of these embodiments, a TPM sensor include is operated. The sensed pressure information is stored at a transmission buffer of the sensor. External condition information is received at a receiver circuit of the sensor. A control circuit of the sensor is configured to modify the functionality of the sensor according to the received external condition information. The control circuit causes the sensed pressure information to be transmitted from the transmission buffer according to one or more protocols. Each of the one or more protocols is associated with a vehicle manufacturer.

In others of these embodiments, computer readable non-transitory medium includes a computer readable program code embodied therein. The computer readable program code is adapted to be executed to implement a method of operating a tire pressure monitoring system. The method includes sensing pressure information of a tire at a pressure sensing device; storing the sensed pressure information at a transmission buffer; receiving external condition information at a receiver circuit; at a control circuit, modifying functionality of the sensor according to the received external condition information; and by the control circuit, transmitting the sensed pressure information from the transmission buffer according to one or more protocols, each of the one or more protocols associated with a vehicle manufacturer.

Referring to FIG. 1, a tire pressure monitoring system 100 is shown assembled or disposed within a vehicle 102. The system 100 includes a receiver device 106 that receives communications from tire pressure monitoring sensors 104 (also referred to as "monitors" or "devices") assembled or disposed within each of the vehicle's tires 108. The receiver device 106 may be any communication device configured to receive any type of transmitted communication but tuned to only recognize some of these communications. In one example, these communications are radio frequency (RF) communications, but other types of communications (e.g., Bluetooth, or Bluetooth low energy (BLE)) are also possible.

Although the devices 104 are described as a tire pressure monitoring devices herein, it will be appreciated that these devices can gather and transmit other types of information related to the tire in addition to or in place of tire pressure information. For example, the information can include temperature information or information related to the wear of the treads of the tire. Appropriate sensors or sensing devices may be used to obtain this information. Other examples of information may also be gathered by the tire pressure monitoring sensors 104.

Each of the tire pressure monitoring devices 104 are assembled or disposed within the tires 108 of the vehicle 102 and, as mentioned, communicate information indicative of conditions within the tires 108 to the receiver device 106. These conditions include temperature, pressure, and/or any other desired information that aids in the evaluation of tire conditions. Other examples of conditions may also be sensed. In some examples, each of the tire pressure monitoring devices 104 includes an accelerometer.

The system 100 includes the tire pressure monitoring devices 104 that in this example includes a memory device 126. The memory device 126 (any type of permanent, temporary, or combination of permanent or temporary electronic memory device) is utilized for the storage of a control program 128. The memory device 126 may also be used to store parameters or settings (at various memory locations) that determine, affect, or define (in whole or in part) operation of the sensors 104. The control program 128, when executed, transmits sensed information (e.g., tire pressure information) according to one or more protocols (or formats) that govern operation and communication between the tire pressure monitoring sensors 104 and the receiver device 106. Examples of communication protocols that may be used include protocols that specify the frequency and timing of transmissions from the tire pressure monitoring device 104 to the receiver 106 or the format of transmission (such as what constitutes a "1" or a "0," modulation type, error detection and/or correction content, synchronization pattern, and so forth to name but a few examples in these regards). Tire pressure monitoring information may be transmitted according to the protocols sequentially (e.g., using the same antenna) or at the same time (e.g., using different antennas).

The memory device 126 (which can be any type or permanent electronic memory, temporary electronic memory, or combination of permanent and temporary electronic memory) is utilized for the storage of a control program 128. In one aspect, the control program 128 may be executed continuously whenever the vehicle is moving. The control program 128 may also be executed when the vehicle is not moving, but only when the sensor is activated externally (i.e., via LF or grounding of a pin on the ASIC during manufacturing). At other times, it may not be executed. The control program 128, as described elsewhere herein, specifies how and when pressure (or other information) is transmitted from the sensor 104. The control program 128 may perform other functions as well.

Learning the identities of the sensors 104 and/or determining where each device is located ("localization", e.g., front left, front right, and so forth) may be accomplished by using an activation device 120. The activation device 120 emits a wireless signal 122 (e.g., an LF signal) that is received by a corresponding one of the tire pressure monitoring devices 104. Receipt of the wireless signal 122 causes the device 104 to transmit identity information and also indicate to the receiver 106 that the device 104 has received an LF signal and that the localization process can occur. When the vehicle is moving, LF transmitters (e.g., antennas) may transmit LF signals (in place of the device 120). When moving, the RF signals are periodically being transmitted and when the device 104 finds an LF signal, it so indicates to the receiver device 106 (e.g., by flipping a bit in the RF transmission). Once this indication is received, localization can be completed (e.g., this process may occur for a predetermined amount of time to ensure that the sensor 104 is correctly localized). Once localization is complete, tire pressure information can be associated with a known tire. It will be appreciated that in other examples, the control program may itself be activated by the LF signals.

The activation device 120 includes a series of selectable buttons 124 (or other types of actuators) that are actuated by a user to indicate that they wish to activate the tire pressure monitoring device. Although the example device 120 is shown with buttons, other display and selection configurations, such as touch screens, switches or some other selection interface may be used as will be appreciated by those skilled in the art. Accordingly, installation of the tire pressure monitoring devices 104 optionally includes the initial step of physically activating the tire pressure monitoring sensors 104 within each of the corresponding tires 108 or activate a localization process that allows tire pressure data to be associated with particular tires.

If an activation device is used, the activation device 120 is placed proximate to each of the tire pressure monitoring devices 104 to send a signal 122. In one example, the signal 122 is a low frequency transmission received by the proximate tire pressure monitoring device 104.

The sensors 104 operate with the receiver device 106 in the vehicle and the receiver device 106 typically has a display (or some sort of user interface) that is configured to alert the driver when the tire pressure falls below a predetermined threshold value. As mentioned, once physically installed in the tire, the devices 104 are first "learned" by the receiver device 106. During this process, the receiver device 106 determines the particular identifiers and during or after learning, a localization process may be executed in which each of the sensors 104 is associated with a particular tire.

During normal operation (after the sensors are learned and localized and the vehicle is moving), the device 104 senses the tire pressure and sends a radio frequency (RF) signal (or other types of signals) to the receiver device 106 indicating the tire pressure. The receiver device 106 can then determine if a pressure problem exists. If a problem exists, the user can be alerted so that appropriate action can be taken. As mentioned, this is all accomplished by use of a control program that is compiled, translated, and/or assembled before it is executed.

As mentioned, the sensors 104 transmit tire pressure information. In aspects, the signals that are transmitted include bursts that themselves include plurality of frames and each of the frames includes the tire pressure monitoring information. A plurality of pause spaces may be disposed between at least some of the frames in the burst. Characteristics of the frames in the burst or of the burst itself may be configured based upon criteria such as government standards, industry requirements, receiver requirements, periodicity requirements, or power requirements. Other examples of criteria are possible.

The characteristics of the signal may include the total number of frames in the burst, the relative positioning of the frames within the burst, the number of frames in the burst from each of plurality of manufacturers, and the relative positioning of the frames within the burst wherein at least some of the frames are from different manufacturers. Other examples of characteristics are possible.

In another example of the operation of the system of FIG. 1, pressure information of a tire is sensed at a sensing device of the sensor 104. The sensed pressure information is stored in transmission buffer of the sensor 104.

At a receiver circuit of the sensor 104, acceleration or motion information is received from an accelerometer and sensed burst patterns are received from other tire pressure monitoring sensors. In some examples, the accelerometer is physically integrated with the control circuit of the sensor 104. In other examples, the accelerometer is external to the sensor 104.

A control circuit at the sensor 104 causes transmission of a first burst pattern from the transmission buffer of the sensor 104 to an external receiver device via the transmitter circuit. The first burst pattern comprises the sensed tire pressure information according to a plurality of communication formats for a plurality of vehicle (e.g., automobile) manufacturers. The control circuit at the sensor 104 analyzes the received acceleration or motion information and when the analyzing indicates that motion or acceleration is detected, the control circuit analyzes the detected burst patterns from the other sensors that are received via the receiver circuit at the sensor 104. In aspects, no analysis of other transmission occurs when no motion or acceleration is detected. Based upon analyzing the detected burst patterns from the other sensors 104, the control circuit selectively alters the first burst pattern to a single communication format for a single vehicle manufacturer, and causes the transmitter circuit to transmit the pressure information in the transmission buffer according to the single communication format. In one specific example, the number of protocols is reduced from over 10 to 1. Other examples of reductions are possible.

In some aspects, more than one protocol is transmitted even after the reduction takes place (e.g., the most likely protocols are transmitted so there may be more than one transmitted even after the reduction is made). That is, the control circuit of the sensor 104 reduces the number of protocols that are transmitted (but not down to 1) and there may be two or more of these protocols. This may be the case when the control circuit of the sensor 104 cannot fully determine or is uncertain as to which single protocol is to be transmitted and hedges by transmitting the most likely protocols.

A likelihood that a protocol is correct may be determined by the control circuit and if the likelihood is above a predetermined threshold value, then the protocol may be used to make transmissions. For example, a threshold may be set to 40%. Thus, in this example, the number of protocols is reduced from 10 to 2 when one protocol has a 41% of being correct, another has a 42% chance of being correct, and the other eight vary in the single digits. Other examples are possible.

In aspects, these approaches can be instigated (i.e., a single or reduced number of protocols selected) every time acceleration or motion is detected. Consequently, the protocols chosen at one time may be different than those selected at a different time. For example, two protocols may be chosen at a first time, and this can be changed to one protocol selected at a second time as the probabilities for protocols being correct are re-computed and change.

When no motion is detected (e.g., for a predetermined time period such as 15 minutes) and in some examples, transmission of all protocols may be resumed by the sensor 104. That is, the state of transmissions may re-set to an original state (where all protocols are transmitted) after a predetermined period of time.

In another example of the operation of the system of FIG. 1, pressure information of a tire is sensed at a sensing device of the sensor 104. The sensed pressure information is stored in transmission buffer. The pressure information may be sent from the sensor to the receiver device 106.

A mapping is stored in a memory storage device of the sensor 104. The mapping comprises a plurality of identifier ranges being programmatically mapped to a plurality of protocols and each of the protocols is associated with an automobile manufacturer. In other examples, the mapping is an equation (or equations) where inputs are entered and the equation yields an identifier for a protocol. Other examples of mapping structures are possible.

A first identifier is received at a receiver circuit of the sensor 104. The first identifier is transmitted from the external receiver device 106 (which is disposed in the vehicle and not in the tires of the vehicle). The first identifier identifies the manufacturer of the vehicle in which the external receiver device 106 and the TPM sensor are located 104.

At a control circuit of the sensor 104, the manufacturer of the vehicle in which the external receiver device 106 and the TPM sensor 104 are located is obtained by applying the received first identifier to the stored mapping. At the control circuit of the sensor 104, the operation of the sensor 104 is configured according to the determined manufacturer of the vehicle 102.

In aspects, the control circuit of the sensor 104 configures operation of the TPM sensor 104 by determining a transmission protocol. For example, the protocols associated with a single manufacturer may be selected. In other aspects, the control circuit of the sensor 104 causes the transmission of a burst pattern from the transmission buffer of the sensor 104 to the external receiver device 106 via the transmitter circuit of the sensor 104. The burst pattern comprises the sensed tire pressure information, according to the determined transmission protocol.

In other examples, the control circuit of the sensor 104 configures operation of the TPM sensor 104 by modifying the functionality of the TPM sensor. As mentioned, the modifications to the functionality may include choosing and implementing a transmission protocol. However, other functionality may be changed such as how sensing is performed by the sensing device of the sensor, the power levels used, or other functions. In examples, changes in the function alter the state of the TPM sensor 104.

In still other examples, the identifier is a media access control (MAC) address. In this case, different manufacturers may be assigned different MAC address ranges (e.g., manufacturer A has addresses 0-10, manufacturer B has addresses 11-20, and so forth).

In yet other examples, the control circuit of the sensor 104 determines a certainty that the received first identifier correctly identifies the vehicle 102 in which the TPM sensor 104 is disposed. In aspects, the receiver circuit of the sensor 104 is configured to receive a second identifier from a wireless device and the control circuit of the sensor 104 determines the certainty using the first identifier and the second identifier.

The above approaches could be semi-permanent, permanent, or instigated every time the vehicle has been at rest (for a predetermined time period) then moves or accelerates. For this purpose an accelerometer may be used and the accelerometer incorporated with the sensor 104.

In yet another example of the operation of the system of FIG. 1, the sensor 104 senses pressure information of the tire 108. The sensed pressure information is stored at a transmission buffer in the sensor 104. External condition information is received at the sensor 104. Functionality of the sensor 104 is modified according to the received external condition information. The sensed pressure information is transmitted from the transmission buffer of the sensor 104 according to one or more protocols, each of the one or more protocols associated with a vehicle manufacturer. The number or identity of the protocols by which transmissions are made may be adjusted as one example of changing the functionality of the sensor 104.

In aspects, some of the approaches described herein differ from simply directly programming and/or re-programming a TPM sensor because a programming tool is not required. Functionality changes and updates to software can automatically be performed without manual or human intervention. In addition, these changes need not be made at a dedicated service center. Thus, the present approaches offer convenience for users and advantageously keep TPM software up-to-date at a minimal cost and with little or no down time for the sensors.

It will be understood that in some examples the initial programming of the sensor may also be accomplished using these approaches thereby completely eliminating the need for a programming tool. In other examples, initial programming may be accomplished with programming tool where a technician manually configures the sensor, but that subsequent updates or changes to functionality are automatically accomplished as described herein.

In yet another example of the operation of the system of FIG. 1, pressure information of a tire is sensed at a pressure sensing device of a sensor 104. The sensed pressure information and an identifier that uniquely identifies the TPM sensor 104 are stored at a transmission buffer in the sensor 104. In examples, the identifier may be stored elsewhere in a memory and downloaded to the transmission buffer when transmissions occur.

A control circuit of the sensor 104 causes a transmitter circuit of the sensor 104 to transmit the identifier from the transmission buffer to the external receiver device 106. The external receiver device 106 is configured to receive the identifier and determine sensor functionality information associated with the identifier. The external receiver device 106 is configured to subsequently transmit the sensor functionality information to the TPM sensor 104.

The sensor functionality information is received at a receiver circuit of the sensor 104. The control circuit of the sensor 104 is configured to configure the operation of the TPM sensor 104 according to the received senor functionality information.

Figure 2:
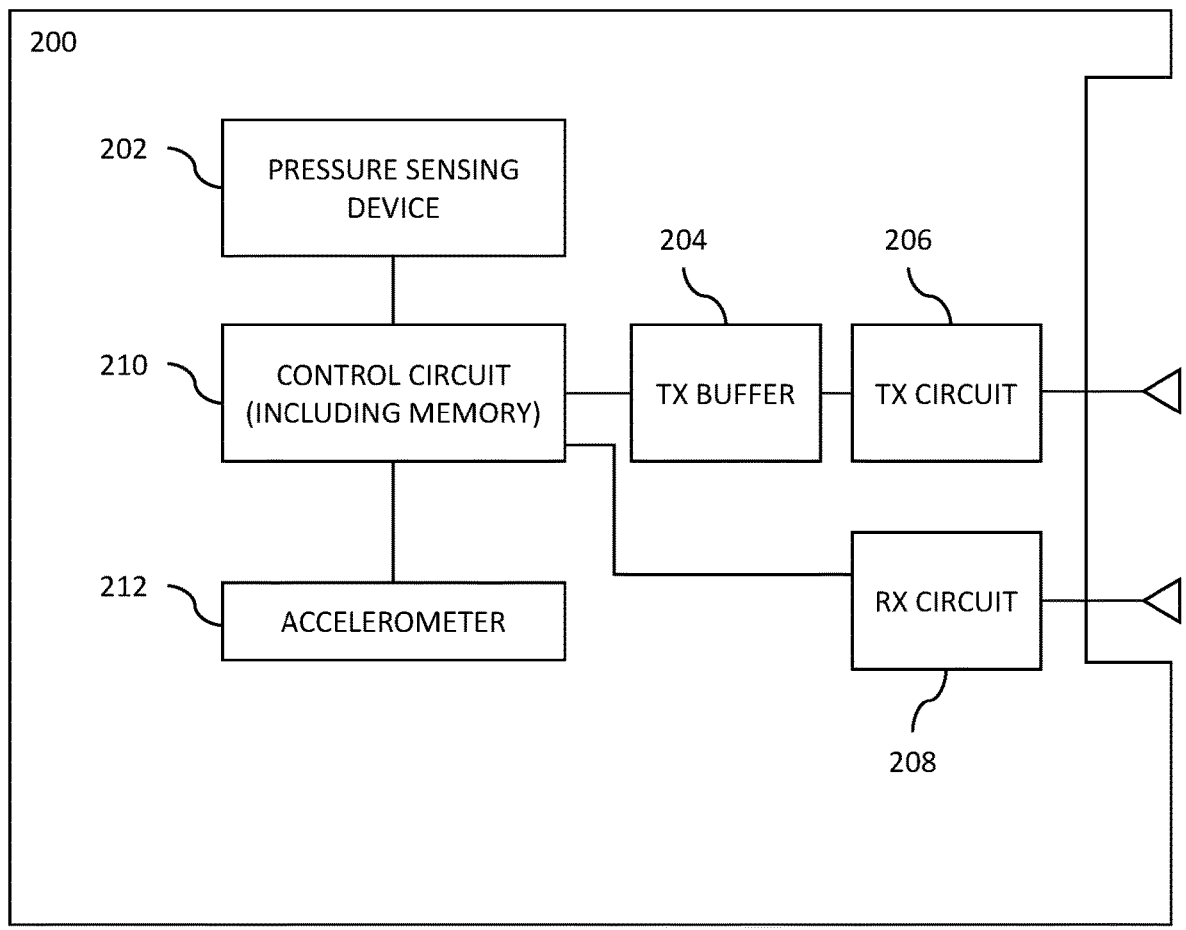
FIG. 2 comprises a diagram of a tire pressure monitoring (TPM) sensor or device as configured in accordance with various embodiments of these teachings.

Referring now to FIG. 2, a tire pressure monitoring (TPM) sensor 200 includes a pressure sensing device 202, a transmission buffer 204, a transmitter circuit 206, a receiver circuit 208, a control circuit 210, and an accelerometer 212.

The pressure sensing device 202 is configured to sense pressure information of a tire. The pressure sensing device 202 is any mechanical or electrical sensing arrangement, device, or apparatus that senses the pressure of the tire as known to those skilled in the art.

The transmission buffer 204 is coupled to the sensing device 202 and the transmitter circuit 206. The transmission buffer 204 is an electronic memory storage device that is utilized to store the sensed pressure information.

The transmitter circuit 206 is configured to transmit a signal including the tire pressure monitoring data. The signal includes a burst that includes one or more frames and each of the frames includes the tire pressure monitoring information. In aspects, a plurality of pause spaces in some examples are disposed between at least some of the frames in the burst. Characteristics of the frames in the burst may be selected based upon criteria such as government standards, industry requirements, periodicity requirements, or power requirements. Other examples of criteria are possible.

As mentioned, the characteristics of the signal (e.g., that are adjusted to meet government standards, industry requirements, receiver requirements, periodicity requirements, and/or power requirements) may include the total number of frames in the burst, the relative positioning of the frames within the burst, the number of frames in the burst from each of plurality of manufacturers, and the relative positioning of the frames within the burst wherein at least some of the frames are from different manufacturers. Other examples are possible.

In aspects, the transmitter circuit 206 includes one or more antennas to transmit the signals. The transmitter circuit 206 may include other functionality such as conversion from one electronic format to another electronic format (e.g., digital to analog or vice versa).

The receiver circuit 208 is configured to receive information from other sensors or from an external receiver device (e.g., the receiver device 106 of FIG. 1). The receiver circuit 208 may share the antennas of the transmitter circuit 206 or have separate antennas. In any case and in examples, the antennas receive other communications (e.g., LF communications) that activate the sensor 200 to transmit the signals. The receiver circuit 208 may include other functionality such as conversion from one electronic format to another electronic format (e.g., digital to analog or vice versa). In still other aspects, the receiver circuit 208 and the transmitter circuit 206 may integrated into a single transceiver circuit.

The accelerometer 212 is any type of device that is configured to measure acceleration and/or motion of the vehicle/tire in which the accelerometer is disposed. In one example, the accelerometer 212 is physically integrated with the control circuit 210. In other examples, the accelerometer 212 is physically separated from the control circuit 210 but within the sensor 200 (i.e., within the sensor housing). In yet other examples, the accelerometer 212 is physically separated from the control circuit 210 but external to the sensor 200 (i.e., external to the sensor housing).

The control circuit 210 is coupled to the pressure sensing device 202, the receiver circuit 208, and the transmitter circuit 206. The term "control circuit" refers broadly to any one (or more) microcontrollers, computers, or processor-based devices with processors, memories, and programmable input/output peripherals, which are generally designed to govern the operation of other components and devices. It is further understood to include common accompanying accessory devices, including memory, transceivers for communication with other components and devices, etc. These architectural options are well known and understood in the art and require no further description here. The control circuit 210 may be configured (for example, by using corresponding programming stored in a memory as will be well understood by those skilled in the art) to carry out one or more of the steps, actions, and/or functions described herein.

The control circuit 210 is configured to cause the transmission of a first burst pattern from the transmission buffer to the external receiver device via the transmitter circuit 206. The first burst pattern comprises the sensed tire pressure information according to a plurality of communication formats for a plurality of vehicle manufacturers.

The control circuit 210 is further configured to perform a first analysis on the received acceleration or motion information and when the first analysis indicates that no motion is detected, perform a second analysis on the detected burst patterns from the other sensors that are received by the receiver circuit 208.

The control circuit 210 is still further configured to, based upon the second analysis of the detected burst patterns from the other sensors, selectively alter the first burst pattern to a single communication format for a single vehicle manufacturer, and cause the transmitter circuit 206 to transmit the pressure information in the transmission buffer according to the single communication format.

In aspects, the pressure information is the measured pressure of the tire. In other aspects, the sensing device 202 further detects temperature information or tread wear information concerning the tire. Other information concerning the tire can also be detected.

In other examples, the detected burst patterns from the other sensors comprise three burst patterns (one burst from each of the other sensors). Each of these three burst patterns are of the same communication format. In aspects, the control circuit 210 can determine the identity of the single format and determine to transmit from the sensor 200 using this single format.

In yet other examples, the detected burst patterns from the other sensors comprise one burst pattern of a single communication format and two burst patterns each having multiple communication formats. In aspects, the control circuit 210 may select the single format as being the correct one since it is the only single format that it detects. In these regards, it ignores the other two transmissions (each having multiple formats) because it assumes any single transmission has a much higher chance of being of the correct format than transmissions using multiple formats.

In other aspects, the detected burst patterns include at least one burst pattern having the single communication format, and the alteration of the first burst pattern is made based upon a probability that the single communication format is correct. For example, the control circuit 210 may determine that the probability that a certain format is correct, and if this probability exceeds a threshold, then the single format is selected. In other examples, the probability that two formats are correct may be close (e.g., one format has a probability of 40% of being correct and another has a probability of 45% of being correct). Consequently, both formats may be selected to make transmissions due to the closeness of the probability numbers (e.g., within a threshold).

In still other examples, the sensor 200 is moved from the tire of a first vehicle to a tire of a second vehicle and the detected burst patterns are from sensors on the second vehicle. In this case, the control circuit 210 determines the format or formats to be used as described herein. The ability of the sensor 200 to reset (e.g., when no motion is detected over a predetermined time period) to original settings is in some cases advantageous as the sensor can be moved between different vehicles and (when transmitting all possible formats) will be sure to transmit at least one correct format in the new vehicle. This may not be the case if a single format is permanently programmed into the sensor 200. For example, assume that the sensor 200 is changed in a first vehicle to only transmit format A, but is moved to a different vehicle that requires format D. Since A is now permanently programmed into the sensor 200, then it cannot transmit format D and will not work properly in the new vehicle. However, if the sensor (when no motion is detected), reverts to transmitting all possible formats (e.g., A, B, C, C), it can be placed in the new vehicle successfully since it can learn format D. Even if it did not learn format D, then it would still be useful in the second vehicle since transmissions of ABCD include the required D protocol. In other words, even though the second vehicle has no use for transmissions made according to the A, B, and C protocols, the transmission according to protocol D is still made ensuring that the sensor can be used in the second vehicle.

The control circuit 210 may execute a control program that determines the format or formats to transmit and causes the transmitter circuit 206 to transmit the tire pressure information from the transmission buffer to an external receiver device according to the selected communications format or formats. The control program may use data structures that specify or identify the formats to be used and these data structures are changeable as the format or formats change. Alternatively (or in addition), the control program itself may be altered as different formats are selected and as these formats change. The control program may be stored in the same memory as the transmission buffer or may be stored in a separate memory unit.

Figure 3:
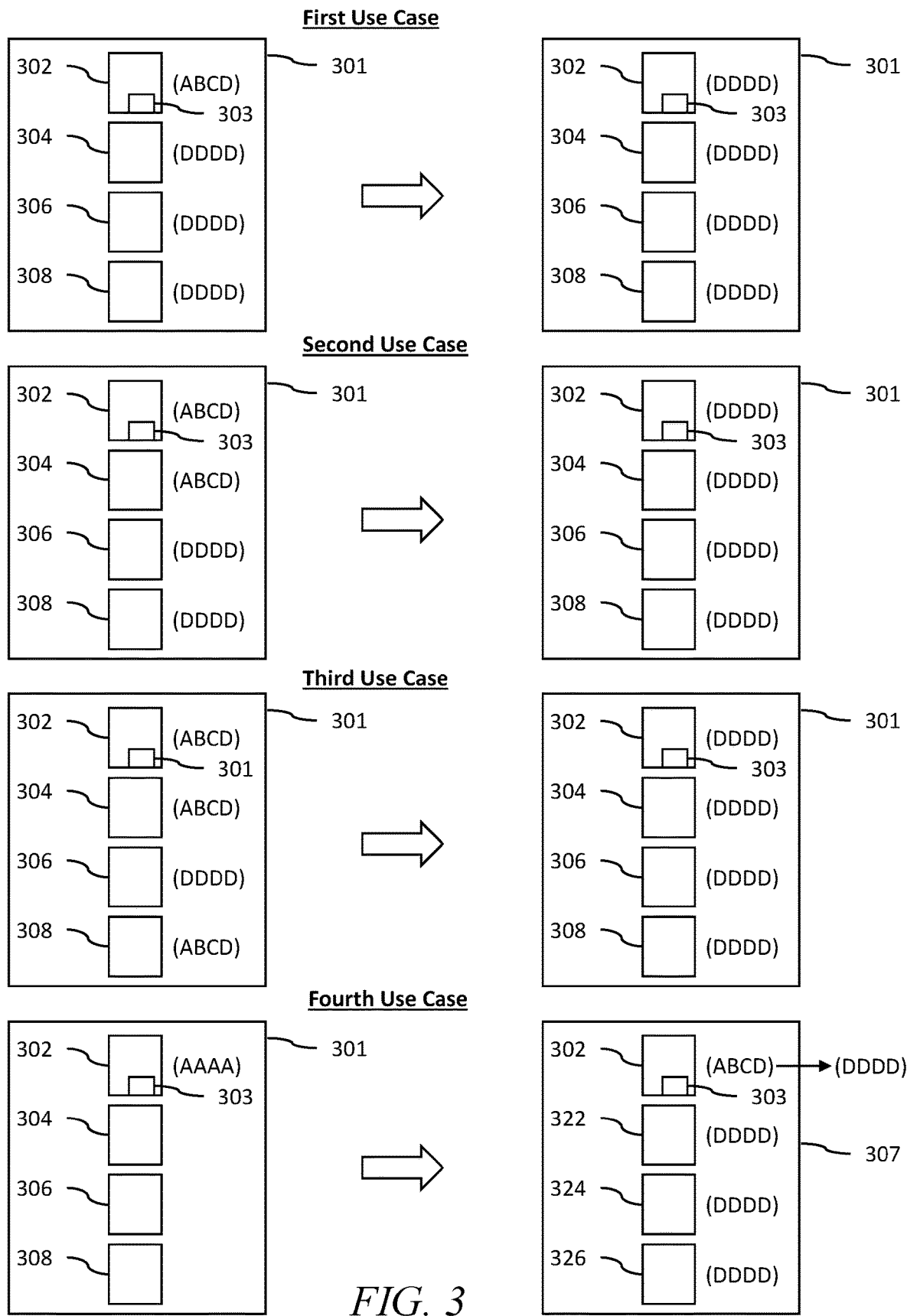
FIG. 3 comprises a diagram of example use cases as configured in accordance with various embodiments of these teachings.

Referring now to FIG. 3, one example of approaches for configuring TPM sensors is described. A first sensor 302 includes an accelerometer 303. The accelerometer 303 detects motion or acceleration of a vehicle 301 in which the sensor 302 is disposed. The sensor 302 also includes a temperature gage and a pressure gage.

The sensor 302 is a multi-protocol sensor and initially transmits the A, B, C, and D (ABCD) protocols. But, the sensor 302 only needs to transmit one protocol. There are three other sensors in the vehicle 301: a second sensor 304, a third sensor 306, and a fourth sensor 308.

As used herein, ABCD (or any other sequence of letters) means that protocol A is transmitted, then protocol B, then protocol C, then protocol D, then protocol A, then protocol B, and so forth (as the ABCD sequence repeats). DDDD means that protocol D is repeatedly transmitted. The timing of the transmission of frames using a particular protocol may vary. For example, protocol D may be transmitted every X milliseconds, where X is varied. In so doing, the amount of silent time or empty space between frame transmissions may vary depending of selections made by a user (e.g., to conform to government regulations). When transmitting all protocols, the protocols may not be aligned at a single instant or fixed point in time. Thus, if sensors 302, 304, and 306 are all transmitting ABCD, at a certain point of time, A may be heard as being transmitted from sensor 302, B, from sensor 304, and C from sensor 306. The next point in time may find sensor 302 transmitting according to protocol B, sensor 304 according to protocol C, and sensor 306 according to protocol D. The fourth sensor 308 would determine that sensors 302, 304, and 306 were transmitting according to multiple protocols.

The system of FIG. 3 is now described with respect to several use cases. The sensors will be described as being "new" and being "old." A "new" sensor is a sensor that may transmit in all protocol formats and is new in the sense that it may be new to the vehicle (never installed previously in the vehicle) and initially set with factory programmed settings. An "old" sensor refers to a sensor that already exists in the vehicle and is making transmissions according to preselected protocols (either a single or multiple protocols). In these use cases, assume that "new" sensors are looking to select (preferably) a single protocol to use based upon an analysis of transmissions receiver, for example, from "old" sensors.

In a first use case, the first sensor 302 is new and transmits ABCD, the second sensor 304 is old and transmits DDDD, the third sensor 306 is old, and transmits DDDD. The fourth sensor 308 is old and transmits DDDD. The first sensor 302 always detects DDDD from all other sensors. So, the D protocol is likely the correct protocol for the first sensor 302 to use since it is the only protocol detected. Therefore, the first sensor 302 switches to transmitting only protocol D.

The sensors 302, 304, 306, and 308 will have logic that identifies a protocol. For example, certain fields, spacings, bit patterns, byte patterns and/or other characteristics may indicate a certain or define a protocol. These patterns and information are detected and analyzed to identify the protocol of a particular transmission.

In a second use case, four sensors are used. The first sensor 302 is new and transmits ABCD. The second sensor 304 is new, and transmits ABCD. The third sensor 306 is old and transmits DDDD. The fourth sensor 308 is old and transmits DDDD. Both the first sensor 302 and the second sensor 304 detect a single ABCD transmission (i.e., each sensor detects the other's ABCD transmissions), but each of the first sensor 302 and the second sensor 304 also detect a DDDD transmission. So, both the first sensor 302 and the second sensor 304 determine that the probability is high that protocol D is the correct selection since that is the only transmission of a single protocol each of the sensors 302 and 304 detect or hear. Consequently, both the first sensor 302 and second sensor 304 (after making this determination) are configured to transmit according to protocol D (and make DDDD transmissions).

In a third use case, four sensors are used. A first sensor 302 is new and transmits ABCD. A second sensor 304 is also new and transmits ABCD. A third sensor 306 is old and transmits DDDD. A fourth sensor 308 is new and transmits ABCD.

The first sensor 302, second sensor 304, third sensor 306 detect the others transmitting ABCD and at one time the sensor 306 may detect protocol A, B, C, or D from the other sensors. The first sensor 302, second sensor 304, third sensor 306 detect only consistent protocol: DDDD (from sensor 306). So the first sensor 302, second sensor 304, third sensor 306 determine that protocol D must be the correct one to use because they detect only a single, consistent protocol (i.e., DDDD from sensor 306).

In a fourth use case, the rim of the tire on the vehicle 301 where the first sensor 302 is initially disposed is broken. A determination is made to move the sensor 302 from one tire on the vehicle 301 to another tire on another vehicle 307. The tires are not deflated, in one example. The first vehicle 301 stops (and the accelerometer 303 detects no motion) for 15 minutes, and consequently the first sensor 302 will have to relearn and reverts to transmitting its factory selected or preprogrammed selections (ABCD). Assume that the second vehicle 307 has three sensors 322, 324, and 326 all transmitting DDDD. The first sensor 302 from the old vehicle transmitting AAAA is removed and manually installed on the second vehicle 307 where the existing three sensors (the fourth existing sensor on the vehicle 307 is removed to make way for sensor 302) are transmitting according to protocol D (DDDD).

When no motion is detected by the sensor 302 (either at the vehicle 301 or if it is removed and lies still outside the vehicle 301), the sensor 302 is put into re-learn mode. In re-learn mode, the sensor determines whether it can use a single protocol. In this case, the sensor 302 detects the transmission according to protocol D by the other sensors (DDDD), so the sensor 302 is configured only to transmit D. This result assumes there is at least one sensor on the vehicle that is transmitting DDDD. If all the sensors on the vehicle 307 were new (transmitting ABCD) and sensor 302 were also new (transmitting ABCD), then the sensors 302, 322, 324, and 326 would proceed to transmit according to the ABCD pattern.

In one example, each sensor would retrain itself (re-learn) every time it stops, for example, for a predetermined time period (e.g., 15 minutes). However, in other examples, the change to a single protocol (or reduced number of protocols) could be made semi-permanently (or even permanently) if certain or predetermined conditions are met. For example, if a protocol is received a predetermined number of times, then the protocol may be kept. For instance, if protocol D where heard a predetermined number of times (e.g., 10, 100, or 1000), then the protocol D would be kept until this condition no longer existed or if some other condition were met (e.g., a predetermined amount of time passed or expired).

These functions may be implemented as computer code that is executed at the TPM sensor. In one example, a variable for each protocol may be set to indicate that the protocol should be transmitted. Initially, the TPM sensor may be transmitting according to protocols for A, B, C, and D and the variables associated with these protocols are all set to 1. At some point in time, a decision is made to transmit only according to the D protocol. In this case, the variables associated with protocols A, B, and C are set to 0, while the variable associated with protocol D remains set at 1, thereby causing transmissions to be made only according to protocol D. In other words, the computer code causes only protocol D to be transmitted since the variable associated with protocol D is the only variable that has been set to 1.

In other examples, the change from multiple protocols to one protocol (or at least a reduced number of protocols) is semi-permanent (or in some cases, permanent). By semi-permanent, it is meant that the re-setting of protocols is not performed after every time after the vehicle is at rest (e.g., for a predetermined period of time) and then goes back into motion. The length of time the single protocol is used may be predetermined or vary based upon other conditions (e.g., 24 hours or one week regardless of how long the vehicle is in motion or at rest within that time period).

As mentioned, the length of time the single protocol (or reduced number of protocols) is used may vary and be based upon a variety of factors. For example, the single protocol may be transmitted for a predetermined amount of time or until the vehicle is at rest for a predetermined amount of time. Additionally, the single protocol (or reduced number of protocols) may be used as long as the sensor hears the single protocol being transmitted by other sensors. Other examples are possible.

To take a specific example, the criteria as to whether the protocol change to a single protocol is to be made semi-permanent may be related to how many time a single transmission is received by the sensor. For instance, if the sensor detects protocol D 10 times (or some other predetermined number of times), then the sensor may assume that protocol D is likely to be the correct protocol. Consequently, when no motion is detected (e.g., the vehicle comes to rest), and when protocol D has been detected 10 times (or some other predetermined number of times)—the sensor does not revert back to transmitting all protocols (e.g., A, B, C, D) when the vehicle comes to rest, but may wait a predetermined amount of time (such as 24 hours or one week) to revert to transmitting all protocols again. Other examples are possible.

Figure 4:
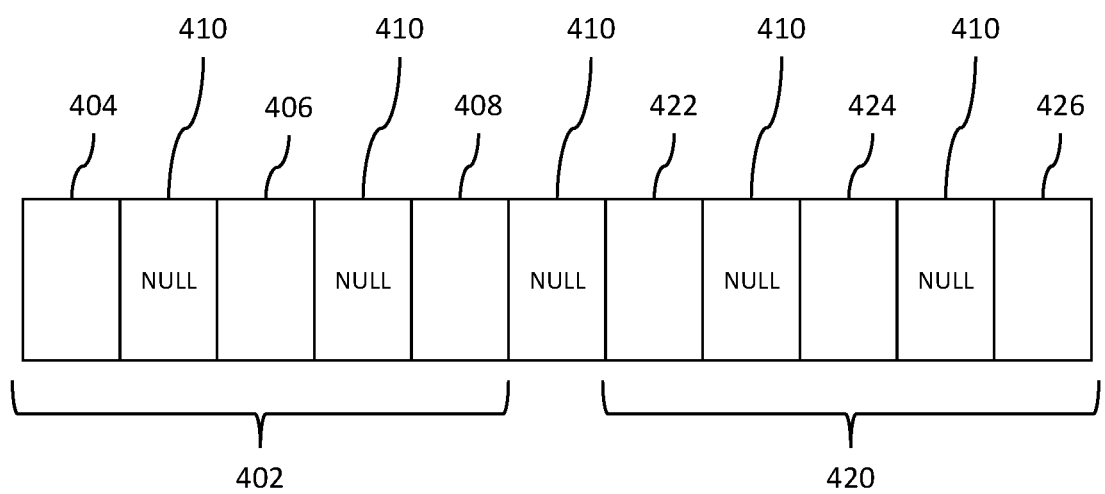
FIG. 4 comprises a diagram of protocol arrangement as configured in accordance with various embodiments of these teachings.

Referring now to FIG. 4, one example of transmissions from a sensor is described. In this example, a first burst 402 includes blocks (or frames) 404, 406, and 408. A second burst 420 includes frames 422, 424, and 426. Null frames 410 are inserted between the frames, 406, 408, 410, 422, 424, and 426.

Each of the blocks or frames 404, 406, 408, 422, 424, and 426 includes tire pressure information. This information may be in the same or different formats. In one example, all frames 404, 406, 408, 422, 424, and 426 include the information according to the protocol of a first vehicle manufacturer. In another example, frame 404 is in the protocol of a first manufacturer, frame 406 is according to the protocol of a second manufacturer, frame 408 is in the protocol of the first manufacturer, frame 422 is in the protocol of a third manufacturer, frame 424 is according to the protocol of a fourth manufacturer, and frame 426 is according to the protocol of a fifth manufacturer. In still another example, the frames are in the format of completely different manufacturers. In other aspects, a manufacturer may have different formats. For instance, a first manufacturer may have a first format and a second format.

Frames may be configured according to a vehicle protocol, which in some examples is specified by a particular vehicle manufacturer. By protocol, it is meant the format, baud rate, transmission scheme, bit pattern, byte pattern, and content of the frames. To transmit according to the protocol means to make transmissions that conform to the protocol. In one example, the frame may be divided into fields with specific content and meanings. In some examples, the frame may have a header and the header may identify the protocol. Other examples are possible.

In one aspect, once the burst is sent, it is repeatedly transmitted. The repetition is immediate and each new burst includes newly updated information transmitted in each frame of the burst. In another example, once the first burst 402 is sent and then a predetermined time later (e.g., 17 seconds) the second burst is sent. Then, the pattern is repeated.

In some examples and described herein, the burst pattern is selectively changed. As described elsewhere herein and in one example, the amount of protocols transmitted is reduced from two or more to one. In one particular example, after a determination is made by the TPM sensor to reduce the protocols to one, only frame 404 is transmitted and the remaining frames are, in examples, null frames.

In other examples, a change of sensor functionality causes a change in the burst structure. For example, the number of frames and/or the content of these frames may be changed. In other examples, the burst structure is fixed and other functionality of the sensor is changed. In still other examples, both the burst structure and other functionality of the TPM sensor can be changed.

Figure 5:
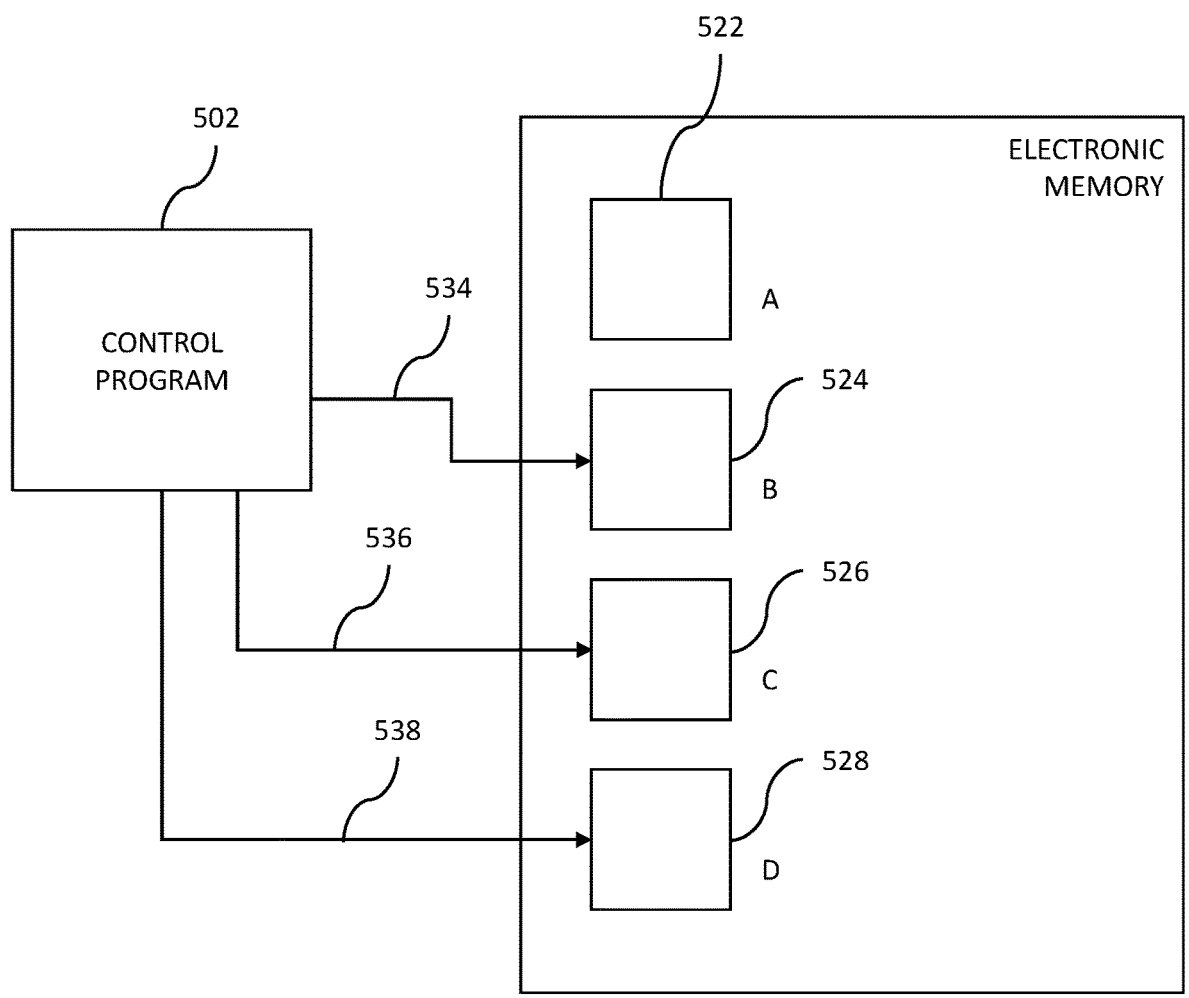
FIG. 5 comprises a diagram of an apparatus as configured in accordance with various embodiments of these teachings.

Referring now to FIG. 5, further details concerning changing the burst pattern are described. A control program 502 is executed to transmit the tire pressure information from the transmission buffer to an external receiver device according to one or more of a plurality of communications formats. The control program 502 determines whether to transmit according to one of four formats (A, B, C, D). The control program examines four memory locations 522, 524, 526, and 528 to see if it should transmit according to a particular format. The memory locations 522, 524, 526, and 528 may represent or be programmable variables. Location 522 corresponds to format A for manufacturer A. Location 524 corresponds to format B for manufacturer B. Location 526 corresponds to format C for manufacturer C. Location 528 corresponds to format D for manufacturer D. The value for each location is a logical one or a zero. If the value is one, then a transmission will be made according to the format. If the value is zero, no transmission will be made. Thus, if location 522 is set to a one, then the sensor will transmit sensed pressure information according to the format of manufacturer A. If location 522 is set to a zero, then the sensor will not transmit sensed pressure information according to the format of manufacturer A.

In this example, at time 1, all locations are set to one. Thus, all transmissions are format A, then B, then C, then D, and then repeating the same pattern (ABCD). At a second time, a determination is made to transmit according to a single protocol, in this case protocol A. Actions 534, 536, and 538 set locations 524, 526, and 528 to zero, but no action is undertaken to set location 522 to zero (i.e., it is left at a one). Thus, only protocol A is transmitted (i.e., the pattern is AAAA).

It will be appreciated that this is one example of implementing the approaches described herein and that other examples are possible.

Figure 6:
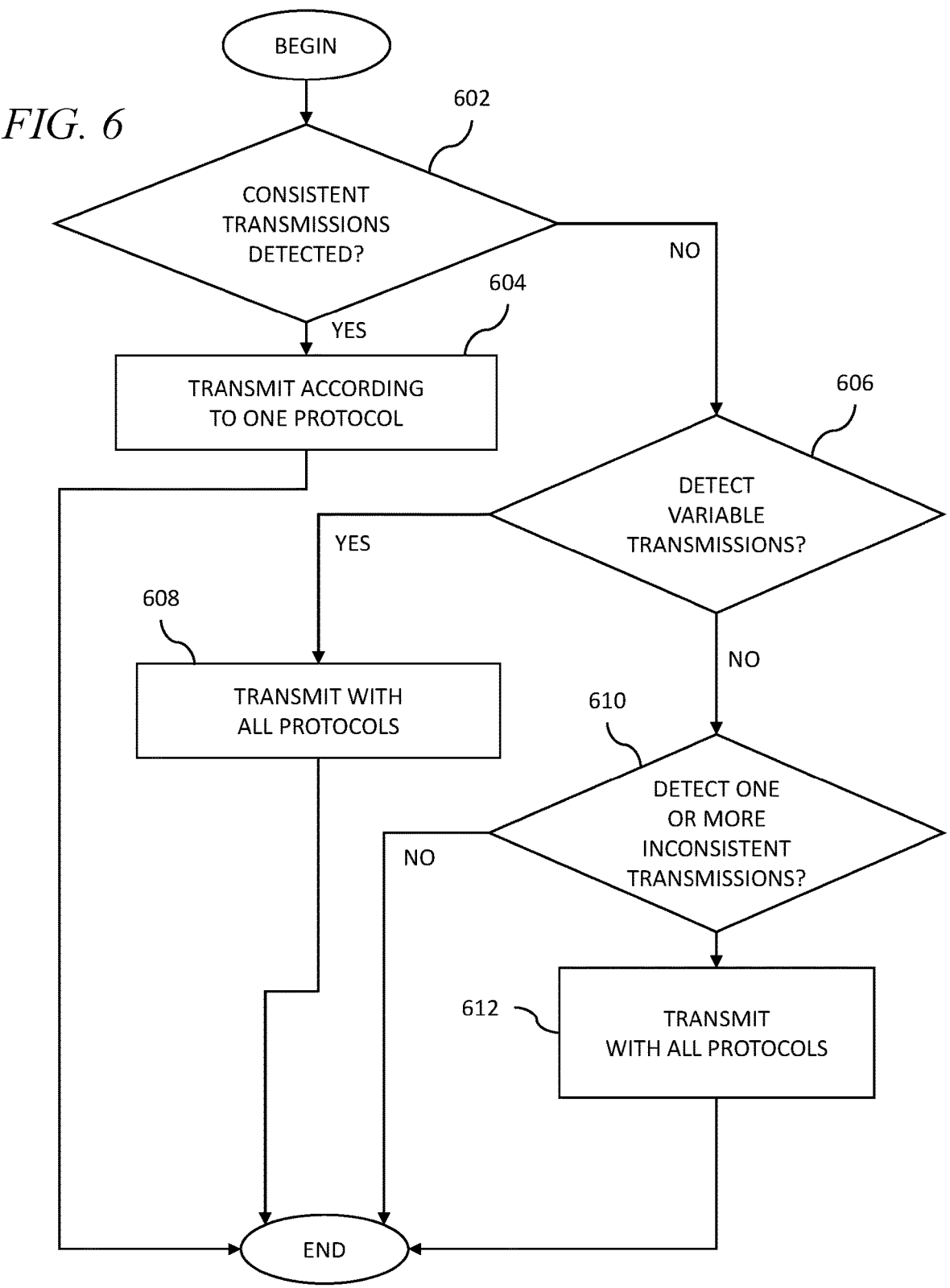
FIG. 6 comprises a flowchart as configured in accordance with various embodiments of these teachings.

Referring now to FIG. 6, one example of an approach used by a sensor to select a single protocol (or reduce the number of protocols used) is described. A tire pressure monitoring (TPM) sensor has a receiver circuit that senses transmissions from other TPM sensors. The TPM sensor is initially transmitting according to all protocols (e.g., the sensor transmits A, B, C, and D, then repeats). It will be appreciated that the approach of FIG. 6 is only one example and that other examples are possible.

At step 602, the sensor determines whether it has detected one or more consistent transmissions of the same protocol from one or more other sensors. In these regards, the sensor may examine the frames (e.g., examine the headers) and/or look for a particular pattern.

In one example, where four protocols are possible, the sensor may determine if it is only hearing or detecting protocol D from one or more other sensors. If the answer is affirmative, then execution continues at step 604 where the TPM sensor is set to transmit according to the single, consistent protocol (e.g., protocol D in this example) and then execution ends. If the answer is negative, execution continues with step 606 below.

At step 606, the sensor determines whether it detects only variable or random protocol transmissions over time. For example, where four protocols are possible, the sensor may determine if it is hearing A from a one sensor at a first time (followed by B, C, and D at other times), B from a second sensor at the first time (followed by C, D, and A at other times), and C from a third sensor at the first time (followed by D, A, and B at other times). If the answer is affirmative, then execution continues at step 608 where the TPM sensor continues to transmit with all protocols (no change is made) and then execution ends. If the answer is negative, execution continues with step 610 below.

At step 610, the sensor determines whether it has detected one or more inconsistent transmissions of the same protocol. For example, where four protocols are possible, the sensor may determine if it is hearing or detecting protocols A from one sensor, B, from another sensor, and C from another sensor. If the answer is affirmative then execution continues at step 612 where the TPM sensor continues to transmit with all protocols (no change is made) and then execution ends. If the answer is negative, execution ends.

Figure 7:
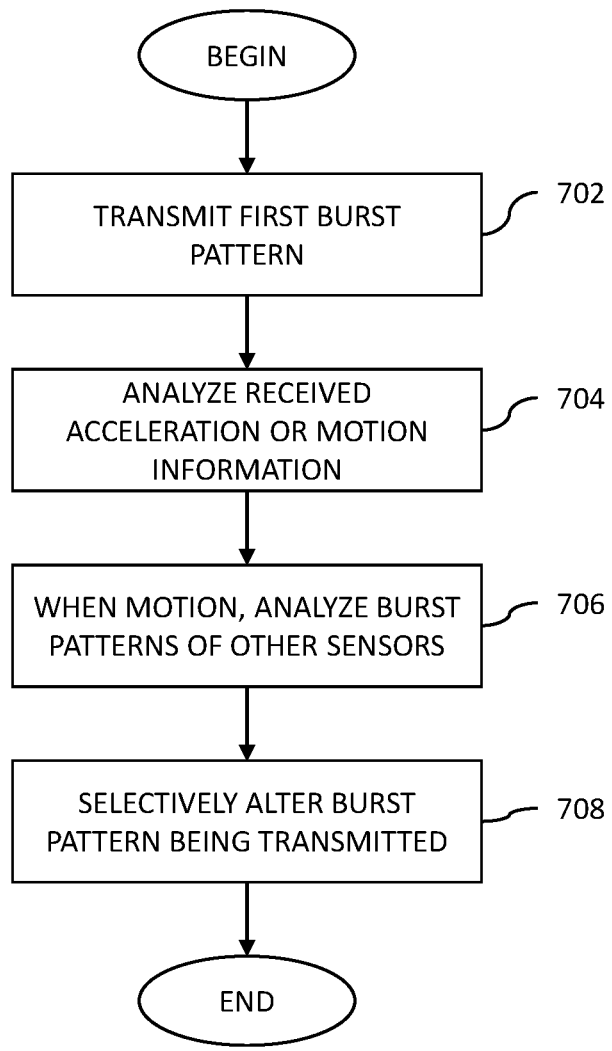
FIG. 7 comprises a flowchart as configured in accordance with various embodiments of these teachings.

Referring now to FIG. 7, one example of an approach for configuring a TPMS sensor is described.

Pressure information of a tire is sensed at a sensing device. The sensed pressure information is stored in transmission buffer.

At a receiver circuit, acceleration or motion information is received from an accelerometer and sensed burst patterns are received from other tire pressure monitoring sensors.

At step 702, a control circuit causes transmission of a first burst pattern from the transmission buffer to an external receiver device via the transmitter circuit. The first burst pattern comprises the sensed tire pressure information according to a plurality of communication formats for a plurality of vehicle (e.g., automobile) manufacturers.

At step 704, the control circuit analyzes the received acceleration or motion information. Data in the information may indicate the amount of movement and this information may be determined from the received information.

At step 706 and when the analysis of this information indicates that motion or acceleration is detected, the control circuit analyzes the detected burst patterns from the other sensors that are received by the receiver circuit. In these regards, burst patterns from the other sensors is received and analyzed to determine which protocols are being transmitted by the other sensors. The patterns or sequences of these other protocols may also be determined.

At step 708 and based upon analyzing the detected burst patterns from the other sensors, the control circuit selectively alters the first burst pattern to a single communication format for a single vehicle manufacturer, and causes the transmitter circuit to transmit the pressure information in the transmission buffer according to the single communication format. For example and as explained elsewhere herein, if a single and consistent protocol is detected as being transmitted from all or some of the other sensors, then the control circuit may alter the transmissions it is making to being made according to the single protocol.

Figure 8:
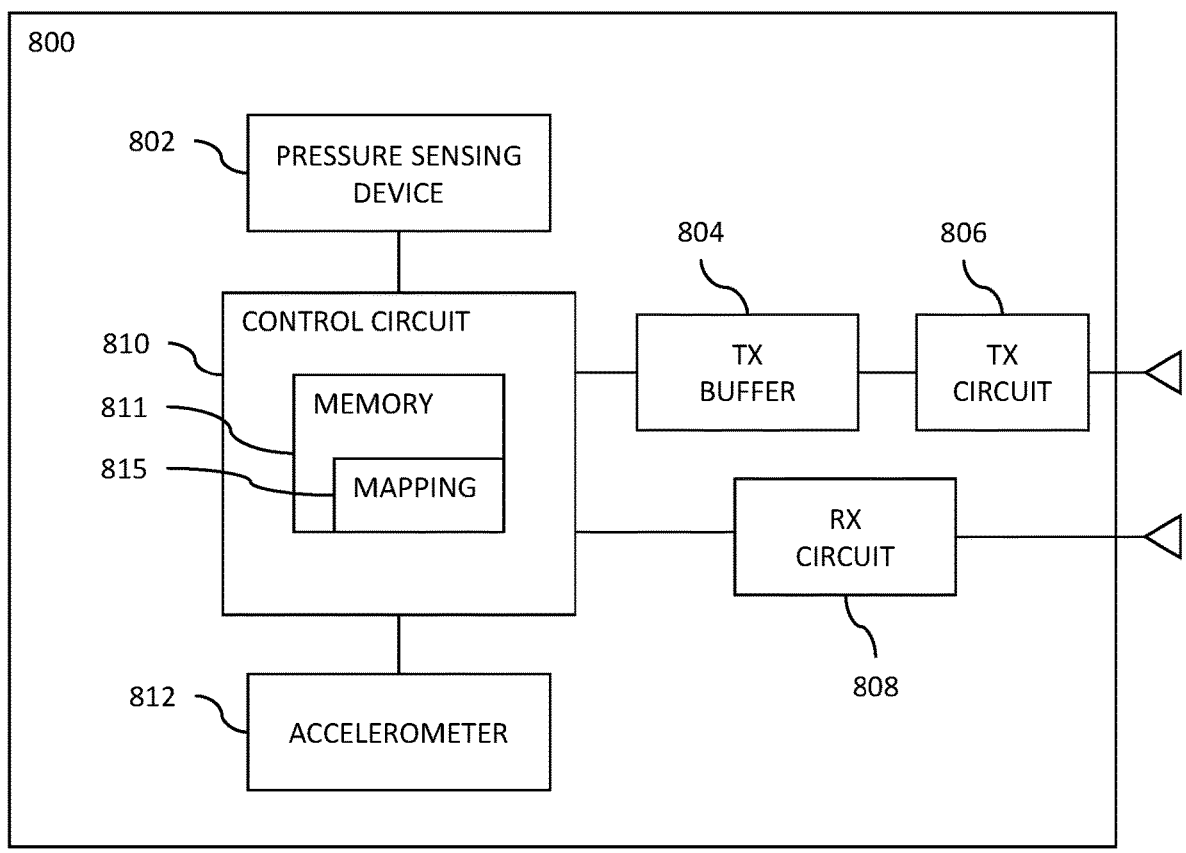
FIG. 8 comprises a diagram of an apparatus as configured in accordance with various embodiments of these teachings.

Referring now to FIG. 8, a tire pressure monitoring (TPM) sensor 800 includes a pressure sensing device 802, a transmission buffer 804, a transmitter circuit 806, a receiver circuit 808, a control circuit 810, and an accelerometer 812.

The pressure sensing device 802 is configured to sense pressure information of a tire. The pressure sensing device 802 is any mechanical or electrical sensing arrangement, device, or apparatus that senses the pressure of the tire as known to those skilled in the art.

The transmission buffer 804 is coupled to the sensing device 802 and the transmitter circuit 806. The transmission buffer 804 is an electronic memory storage device that is utilized to store the sensed pressure information.

The transmitter circuit 806 is configured to transmit a signal including the tire pressure monitoring data. The signal includes a burst that includes one or more frames and each of the frames includes the tire pressure monitoring information. In aspects, a plurality of pause spaces in some examples are disposed between at least some of the frames in the burst. Characteristics of the frames in the burst may be selected based upon criteria such as government standards, industry requirements, periodicity requirements, or power requirements. Other examples of criteria are possible.

The characteristics of the signal (e.g., that are adjusted to meet government standards, industry requirements, receiver requirements, periodicity requirements, and/or power requirements) may include the total number of frames in the burst, the relative positioning of the frames within the burst, the number of frames in the burst from each of plurality of manufacturers, and the relative positioning of the frames within the burst wherein at least some of the frames are from different manufacturers. Other examples are possible.

The transmitter circuit 806 may include one or more antennas to transmit the signals. As mentioned, one or more antennas receive other communications (e.g., LF communications) that activate the sensor 800 transmit the RF signals. The transmitter circuit 806 may include other functionality such as conversion from one electronic format to another electronic format (e.g., digital to analog or vice versa).

The receiver circuit 808 is configured to receive information from other sensors or from an external receiver device (e.g., the receiver device 106 of FIG. 1). The receiver circuit 808 may share the antennas of the transmitter circuit 806. The receiver circuit 808 may include other functionality such as conversion from one electronic format to another electronic format (e.g., digital to analog or vice versa). In other aspects, the receiver circuit 808 and the transmitter circuit 806 may integrated into a single transceiver circuit.

The accelerometer 812 is any type of device that is configured to measure acceleration and/or motion of the vehicle/tire in which the accelerometer is disposed. In one example, the accelerometer 812 is physically integrated with the control circuit 810. In other examples, the accelerometer 812 is physically separated from the control circuit 810.

The control circuit 810 is coupled to the pressure sensing device 802, the receiver circuit 806, and the transmitter circuit 806. The term "control circuit" refers broadly to any one (or more) microcontrollers, computers, or processor-based devices with processors, memories, and programmable input/output peripherals, which are generally designed to govern the operation of other components and devices. It is further understood to include common accompanying accessory devices, including memory, transceivers for communication with other components and devices, etc. These architectural options are well known and understood in the art and require no further description here. The control circuit 810 may be configured (for example, by using corresponding programming stored in a memory as will be well understood by those skilled in the art) to carry out one or more of the steps, actions, and/or functions described herein.

The control circuit 810 includes a memory storage device 811 with a mapping 815. In one example of the operation of the system of FIG. 8, the tire pressure of a tire is sensed using the pressure sensing device 802 that is configured to sense pressure information of a tire.

The mapping 815 is stored in a memory storage device 811. The mapping 815 comprises a plurality of identifier ranges being programmatically mapped to a plurality of protocols and each of the protocols is associated with an automobile manufacturer. The sensed pressure information is stored in the transmission buffer 804.

A first identifier is received at the receiver circuit 808 at the TPM sensor 800. The first identifier is transmitted from an external receiver device disposed in the vehicle and not in the tires of the vehicle. The first identifier identifies the manufacturer of the vehicle in which the external receiver device and the TPM sensor 800 are located.

At the control circuit 810, the manufacturer of the vehicle in which the external receiver device and the TPM sensor are located is obtained by applying the received first identifier to the stored mapping 815. The operation of the TPM sensor is configured by the control circuit 810 according to the determined manufacturer of the vehicle. Configuration may include setting protocols to transmit information from the transmission buffer 804, configuring the sensor 800 to obtain information from the accelerometer 812 (or other devices at the sensor), or otherwise changing the physical operation of the sensor 800.

In aspects, monitoring and performing the above-mentioned actions could be accomplished every time the car moves (or stop for a predetermined amount of time, for example, 15 minutes) as indicated by information received from the accelerometer 812. In other examples, the control circuit 810 does not use information from the accelerometer (i.e., it ignores the accelerometer) and performs these actions at predetermined times (e.g., once every 15 minutes).

Figure 9:
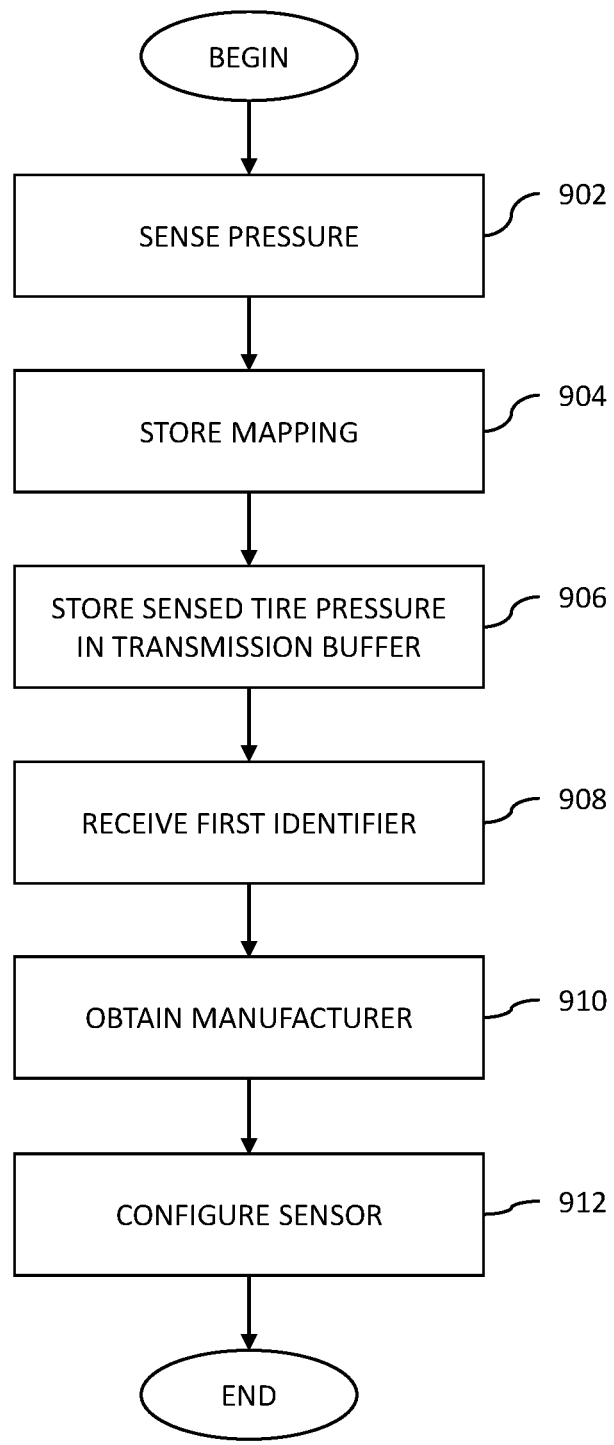
FIG. 9 comprises a flowchart of an apparatus as configured in accordance with various embodiments of these teachings.

Referring now to FIG. 9, one example of an approach for confirming a tire pressure monitoring sensor is described. At step 902, the tire pressure of a tire is sensed using a pressure sensing device that is configured to sense pressure information of a tire.

At step 904, a mapping is stored in a memory storage device. The mapping comprises a plurality of identifier ranges being programmatically mapped to a plurality of protocols and each of the protocols is associated with an automobile manufacturer.

At step 906, the sensed pressure information is stored in a transmission buffer at the TPM sensor. At step 908, a first identifier is received at a receiver circuit at the TPM sensor. The first identifier is transmitted from an external receiver device disposed in the vehicle and not in the tires of the vehicle. The first identifier identifies the manufacturer of the vehicle in which the external receiver device and the TPM sensor are located.

At step 910 and at a control circuit of the TPM sensor, the manufacturer of the vehicle in which the external receiver device and the TPM sensor are located is obtained by applying the received first identifier to the stored mapping.

At step 912 and by the control circuit of the TPM sensor, the operation of the TPM sensor is configured according to the determined manufacturer of the vehicle.

Figure 10:
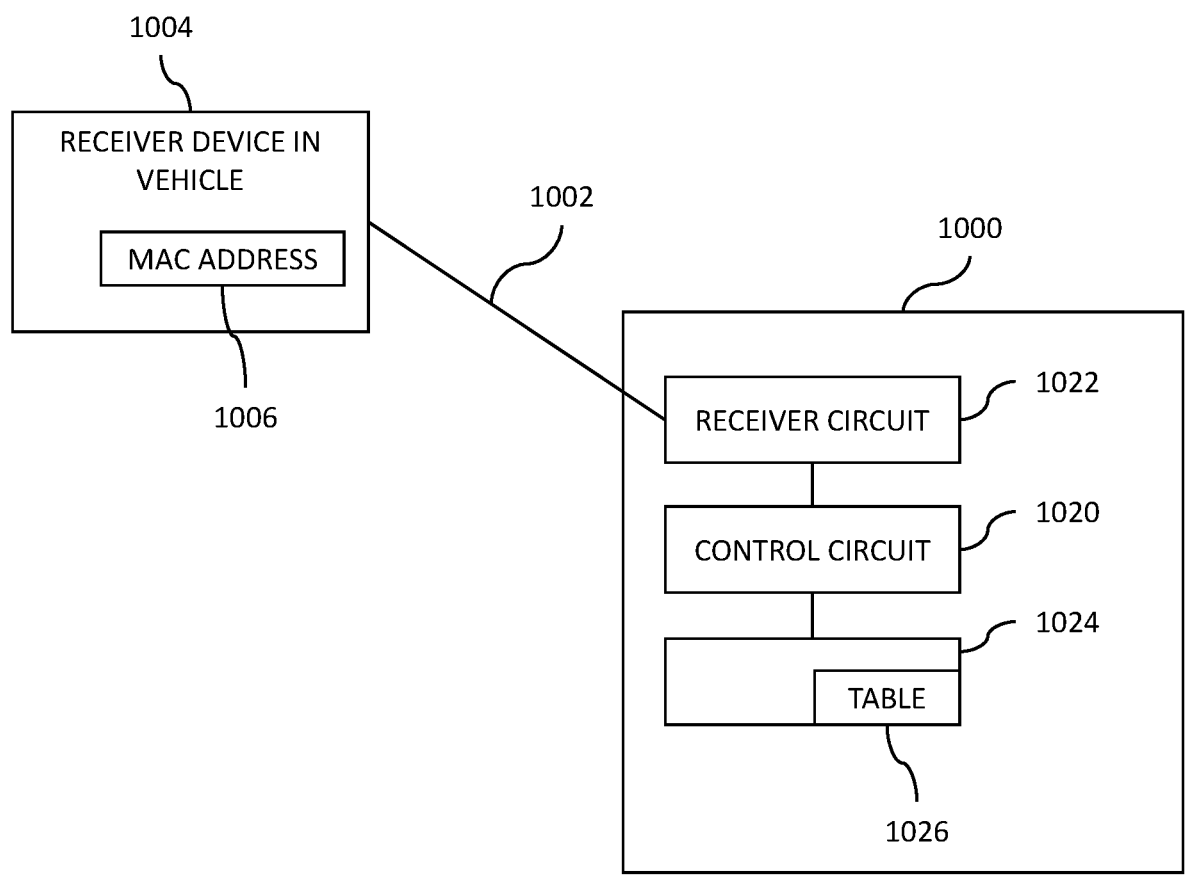
FIG. 10 comprises a diagram of an apparatus as configured in accordance with various embodiments of these teachings.

Referring now to FIG. 10, one example of configuring a tire pressure monitoring (TPM) sensor is described. This describes the mapping between received data and action that are executed at the TPM sensor.

A receiver device 1004 in a vehicle (in one example, a BLE receiver device) has a MAC address 1006. When multiple receiver devices are utilized in the vehicle (i.e., a constellation of receiver devices), then multiple, unique MAC addresses can be used with each receiver device having a MAC address in a predetermined range of MAC addresses. The receiver device 1004, in aspects is disposed in a vehicle and monitors and/or controls the operation of individual TPMS sensors in the vehicle.

A sensor 1000 includes a control circuit 1020, a receiver circuit 1022, and a memory storage device 1024. A table 1026 in the memory storage device 1024 stores ranges of media access control (MAC) addresses and maps these ranges to a manufacturer. In aspects, the MAC address is 6 bytes or 48 bits long.

The sensor 1000 monitors received communications 1002 for a MAC address (or other identifier) using the receiver circuit 1022 to receive the communications and the control circuit to perform the analysis.

In one example, the control circuit 1020 of the sensor 1000 obtains the MAC address 1006, compares it to the range (which it has stored in the table 1026 memory storage device 1024). Consequently, the control circuit 1020 determines which type of car (manufacturer) is associated with the MAC addresses (and hence the sensor 1000). Then, the control circuit 1020 can select a certain functionality (or group of functions to be performed by the sensor 1000), a certain protocol to transmit messages from the sensor 1000 or both.

In aspects, monitoring and performing the above-mentioned actions could be accomplished every time the car moves (or stop for a predetermined amount of time, for example, 15 minutes). Or, the actions could be selectively performed. For instance, the sensor may monitor for tire pressure drops and if there has not been a drop of predetermined magnitude, do not change any functionality.

Figure 11:
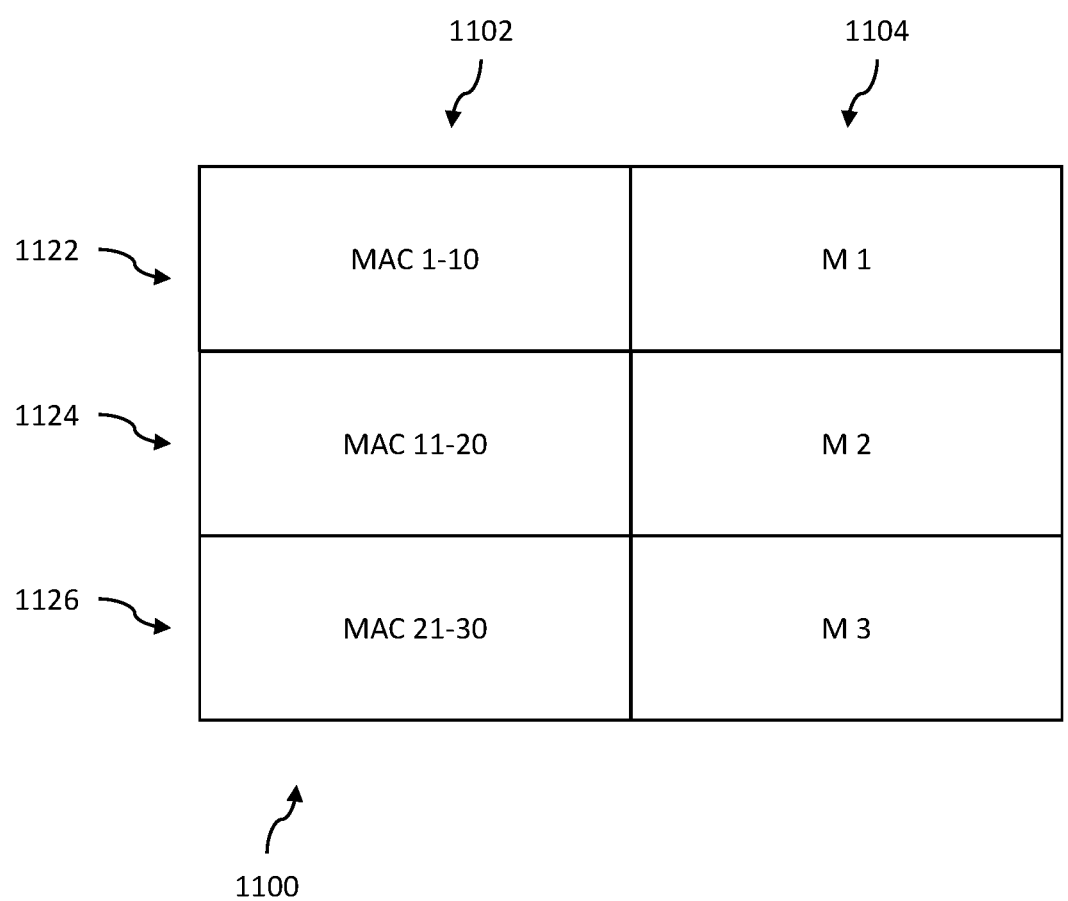
FIG. 11 comprises a diagram of a data structure as configured in accordance with various embodiments of these teachings.

Referring now to FIG. 11, one example of a mapping table 1100 is described. A first column 1102 is a range. MAC1-10 in a first row 1122, MAC11-20 in a second row 1124, and MAC 21-30 in a third row 1126. A second column 1104 is a manufacturer: manufacturer M1 for row 1122; manufacturer M2 for row 1124; and manufacturer M3 for row 1126.

In this example, a MAC address is received. The table 1100 is retrieved. Then, the computer code maps the MAC address to a particular protocol, that is now used. For example, MAC address MAC2 is mapped to manufacturer M1.

Figure 12:
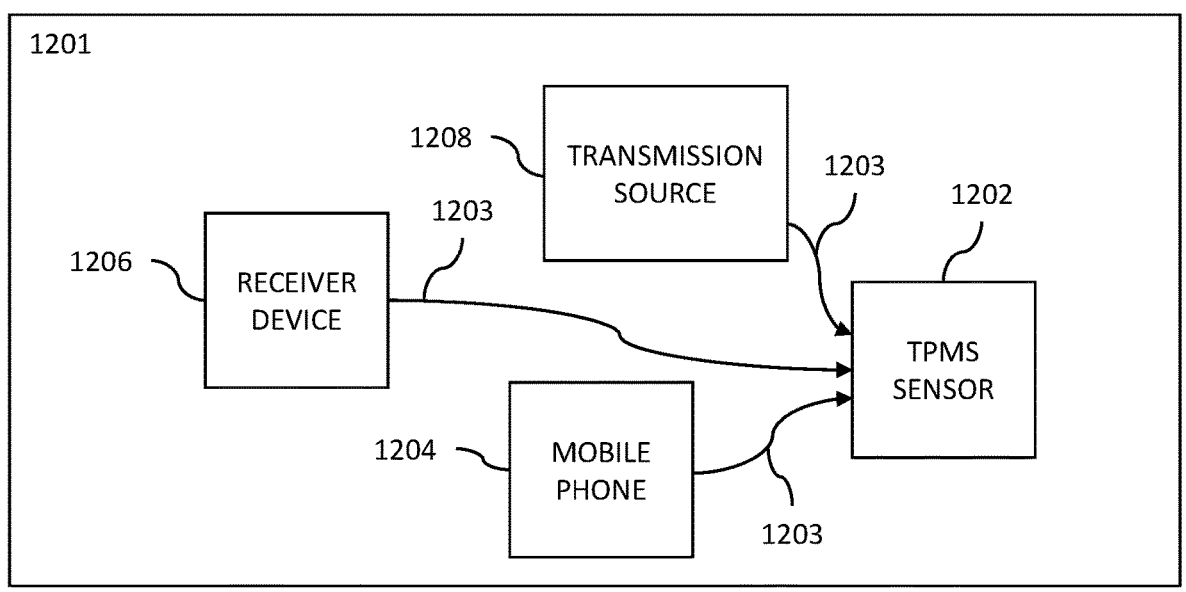
FIG. 12 comprises a diagram of an apparatus as configured in accordance with various embodiments of these teachings.

Referring now to FIG. 12, one example of increasing the confidence level of functionality decisions is described. A system includes a TPM sensor 1202 in a vehicle 1201, a mobile phone 1204; a receiver device 1206 in the vehicle 1201, and a transmission source 1208 in the vehicle (e.g., another receiver device or an instrument in the vehicle to mention two examples). Transmissions 1203 from these devices are received at the sensor 1202. In this example, information from all of these devices is analyzed by the sensor to confirm whether it should transmit according to a given protocol or burst of protocols.

In this example, measures are added that increase the probability that your right. In one example, the phone 1204 transmits something the vehicle name or manufacturer. Also, the transmission source 1208 and receiver device 1206 in the vehicle 1201 transmit two separate MAC addresses. The transmissions 1203 are received at the sensor 1202. In one example, if two out of the three pieces of information match what is expected (e.g., the sensor recognizes the vehicle name, MAC address 1 from source 1208 is manufacturer M1 and MAC address 2 from receiver device 1206 is also Manufacturer M1), then change the sensor to transmit according to the protocol for Manufacturer M1 (i.e., the sensor is confident that it is actually deployed in a vehicle from Manufacturer M1).

Figure 13:
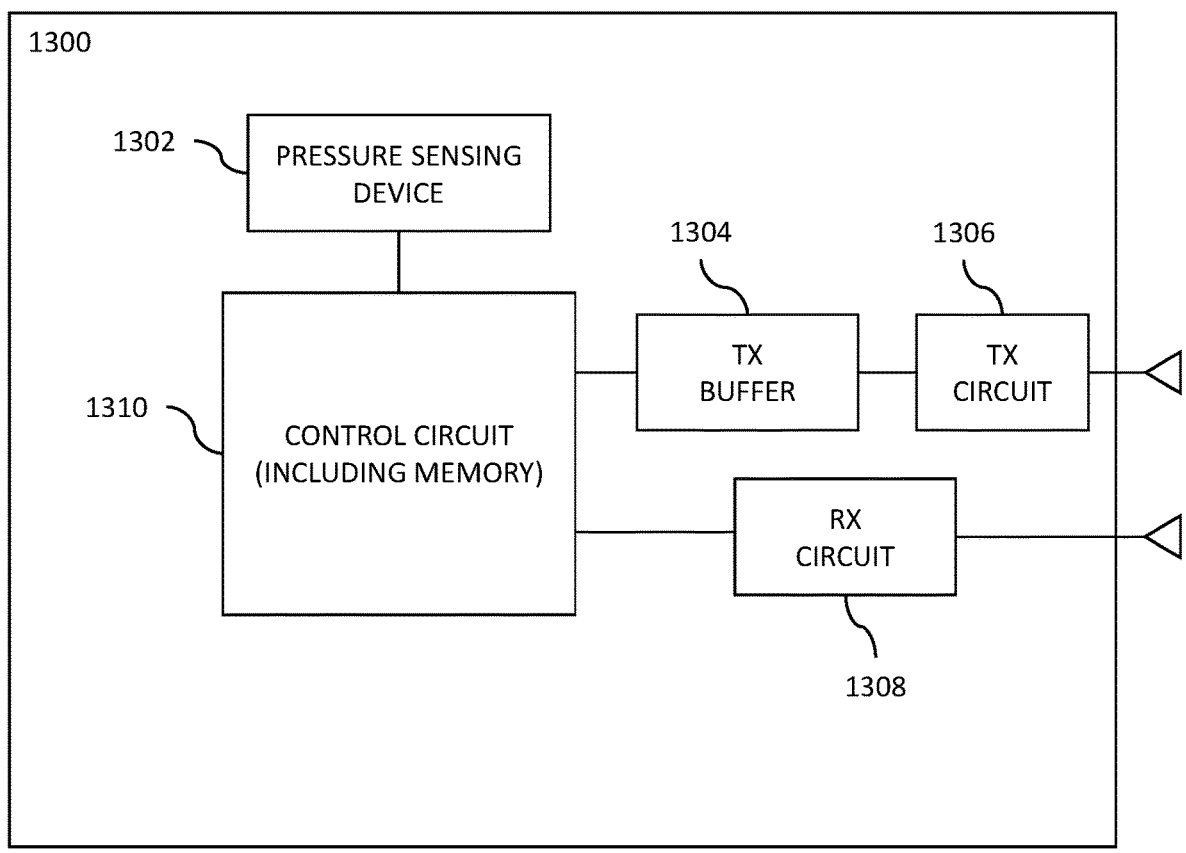
FIG. 13 comprises a diagram of an apparatus as configured in accordance with various embodiments of these teachings.

Referring now to FIG. 13, a tire pressure monitoring (TPM) sensor 1300 includes a pressure sensing device 1302, a transmission buffer 1304, a transmitter circuit 1306, a receiver circuit 1308, and a control circuit 1310. A control program may be executed by the control circuit 1310. The control program may be stored in the same memory as the transmission buffer 1304 or may be stored in a separate memory unit. The control program may be compiled and/or assembled prior to its execution.

In examples, the functionality of the sensor 1300 comprises the timing of transmissions, the power used in transmissions, and the one or more protocols used to make transmissions. Other examples of sensor functionality are possible.

The pressure sensing device 1302 is configured to sense pressure information of a tire. The pressure sensing device 1302 is any mechanical or electrical sensing arrangement, device, or apparatus that senses the pressure of the tire as known to those skilled in the art.

The transmission buffer 1304 is coupled to the sensing device 1302 and the transmitter circuit 1306. The transmission buffer 1304 is an electronic memory storage device that is utilized to store the sensed pressure information.

The transmitter circuit 1306 is configured to transmit a signal including the tire pressure monitoring data at the direction of the control program. The signal includes a burst that includes one or more frames and each of the frames includes the tire pressure monitoring information. In aspects, a plurality of pause spaces in some examples are disposed between at least some of the frames in the burst. Characteristics of the frames in the burst may be selected based upon criteria such as government standards, industry requirements, periodicity requirements, or power requirements. Other examples of criteria are possible.

The characteristics of the signal (e.g., that are adjusted to meet government standards, industry requirements, receiver requirements, periodicity requirements, and/or power requirements) may include the total number of frames in the burst, the relative positioning of the frames within the burst, the number of frames in the burst from each of plurality of manufacturers, and the relative positioning of the frames within the burst wherein at least some of the frames are from different manufacturers. Other examples are possible.

The transmitter circuit 1306 may include one or more antennas to transmit the signals. The transmitter circuit 1306 may include other functionality such as conversion from one electronic format to another electronic format (e.g., digital to analog or vice versa).

The transmission of pressure information from the transmitter circuit 1306 may be made according to one or more of the protocols (e.g., in some cases all protocols) and may be in predetermined block having a pre-defined format. Thus, separate blocks are used to transmit tire pressure information for different protocols. Each of the blocks may be transmitted sequentially in a burst. A null space may be used to separate each of the blocks in the burst.

The receiver circuit 1308 is configured to receive external condition information. In one example, the receiver circuit 1308 comprises a GPS receiver device. Other examples are possible. The receiver circuit 1308 may include antennas or share the antennas of the transmitter circuit 1306. The receiver circuit 1308 may include other functionality such as conversion from one electronic format to another electronic format (e.g., digital to analog or vice versa). In other aspects, the receiver circuit 1308 and the transmitter circuit 206 may integrated into a single transceiver circuit.

The control circuit 1310 is coupled to the pressure sensing device 1302, the receiver circuit 1308, and the transmitter circuit 1306. The term "control circuit" refers broadly to any one (or more) microcontrollers, computers, or processor-based devices with processors, memories, and programmable input/output peripherals, which are generally designed to govern the operation of other components and devices. It is further understood to include common accompanying accessory devices, including memory, transceivers for communication with other components and devices, etc. These architectural options are well known and understood in the art and require no further description here. The control circuit 1310 may be configured (for example, by using corresponding programming stored in a memory as will be well understood by those skilled in the art) to carry out one or more of the steps, actions, and/or functions described herein, for example, using the control program.

The control circuit 1310 is configured to analyze the external condition information and determine a change in functionality (or no change in functionality) based upon this information. For example, certain geographic coordinates may be received and these mapped to the protocols used to make transmissions from the sensor using a mapping or look-up table data structure. The use of these particular data structures may be advantageous since they cause the control circuit 1310 to operate faster or more efficiently. The control program may then be altered (e.g., changing subroutine calls to transmit a particular protocol or setting flags or variables causing the certain protocols to be transmitted). In any case, the physical structure of the sensor (e.g., the control program or data structures) may be physically altered or transformed.

The control circuit 1310 is configured to modify functionality of the sensor 1300 according to the received external condition information after the analysis is completed. As mentioned and in examples, the external condition information comprises a geographic location, a government regulation, a legal jurisdiction, or a weather condition. In examples, this information may be obtained and/or determined by various types of sensors.

The initiation of when the functionality is attempted to be changed can be from some external device or from the sensor 1300 itself. For instance, in some examples, a change in functionality of the sensor 1300 is initiated by an external receiver device (in the vehicle such as the device 106 of FIG. 1) or a central controller (at some central processing location that is removed from the vehicle) after detecting a location change. In still other examples, a change in functionality of the sensor 1300 is initiated by the sensor 1300 as the sensor 1300 performs periodic checks to determine if updated external condition information has been received and/or whether this information has changed.

In still other aspects, external condition information is received at other vehicle instruments and used to alter the functionality of these instruments. For example, the external condition information may be received at a speedometer and the visual layout of the speedometer may be altered (e.g., the speedometer may show kilometers-per-hour in metric standard countries, and miles-per-hour in non-metric standard countries). The external condition information may be communicated directly to the other instruments (e.g., from the external receiver device such as the receiver device 106 of FIG. 1 or from an external GPS system), or, in other examples, communicated from the TPM sensor 1300. In yet other aspects, the TPM sensor 1300 may act as a central or master controller and issue instructions, code, or parameters to the other instruments that the sensor 1300 has received from the receiver circuit. These instructions are transmitted from the transmitter circuit 1306 to these other instruments.

In some examples, additional functionality information may be sent to the sensor 1300 from the external sources and the functionality information may be the code itself, instructions that cause code at the sensor to operate, parameters or setting the affect or control the operation of the sensor 1300, combinations of these elements, or any type of electronic information that controls or affects the operation of the sensor 1300. Other examples are possible.

Figure 14:
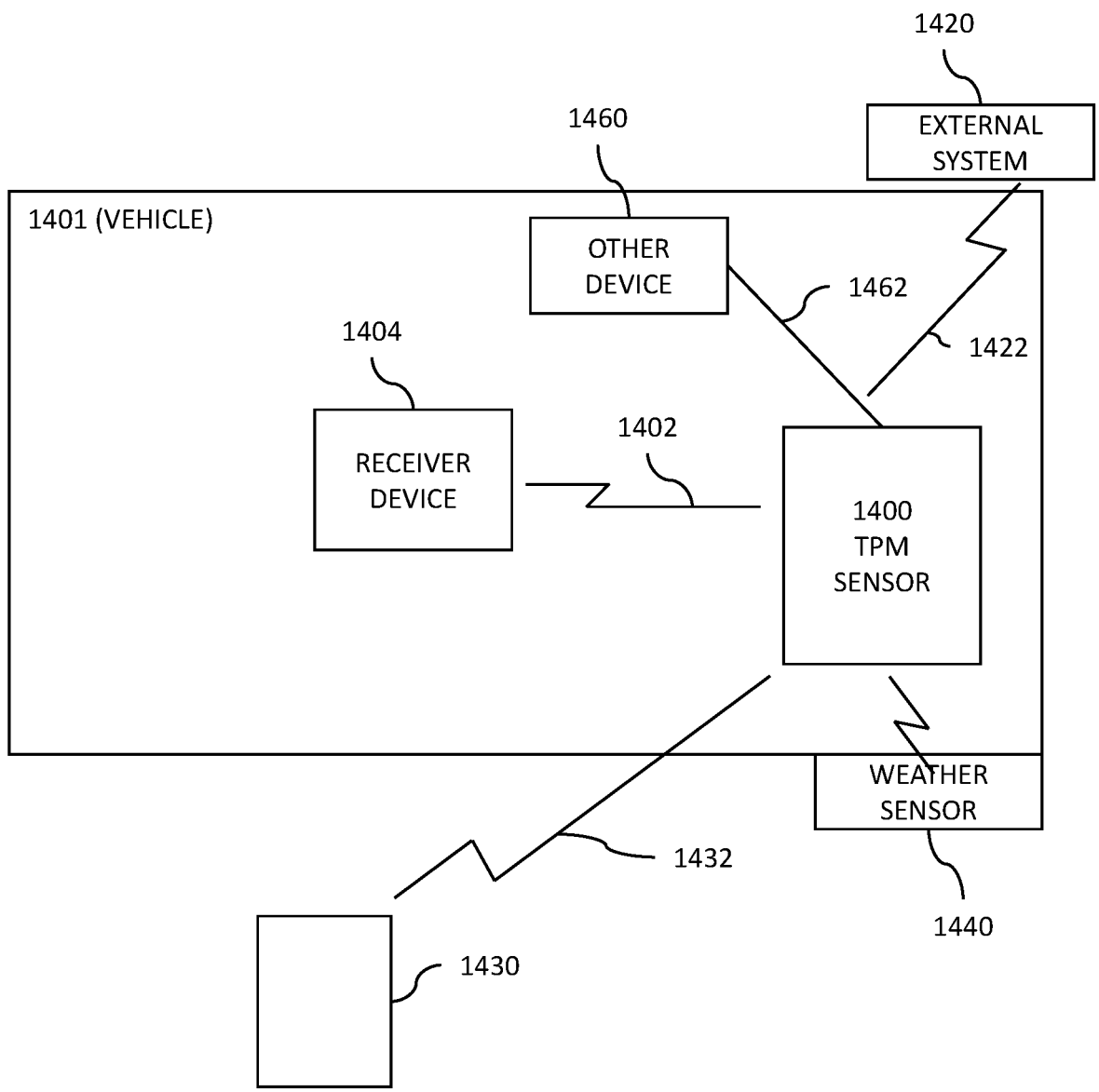
FIG. 14 comprises a diagram of an apparatus as configured in accordance with various embodiments of these teachings.

Referring now to FIG. 14, one example of the operation of a TPM sensor 1400 is described. Various scenarios are described below where external information is received from various external sources, devices, or systems. However, it will be appreciated that not all of the external sources, devices, or systems are required to exist or be utilized in a given implementation. For example, only one of the external sources may exist and this is sufficient. All of the external sources are shown on the same drawing (FIG. 14) to show the variety of external sources that can be used.

In a first example, an external receiver device 1404 in a vehicle 1401 transmits information 1402 to the sensor 1400. The information detected by the sensor 1400 and causes the sensor 1400 to change its functionality. The information may be, in examples, geographic location information (obtained by the device 1404), or government regulation information. The information may be in electronic form.

In a second example, an external system 1420 transmits information 1422 to the sensor 1400. The information 1422 may be directly received from the external system or through the receiver device 1404 (or some other device in the vehicle 1401 such as a repeater). In one example, the external system is a GPS location determination system, which tracks the location of the sensor 1400 and the information 1422 is the location information. The vehicle may have a GPS receiver (and this receiver communicates with the sensor) of the GPS system may communicate directly with the sensor. In another example, the information 1422 may indicate the sensor 1400 is subject to certain government regulations. These may be transmitted, in one example, by a central controller. Other examples are possible.

In a third example, a portable electronic device 1430 transmits information 1432 to the sensor 1400. The information 1432 may be directly received from the portable electronic device 1430 or through the receiver device 1404 (or some other device in the vehicle 1401 such as a repeater). In one example, the portable electronic device 1430 is a cellular phone, smartphone, tablet, personal computer, or similar device and the information 1432 is location information that has been determined by the portable electronic device 1430. In other words, the portable electronic device 1430 determines its own location and transmits this information to the sensor in an electronic format.

In a fourth example, a weather sensor 1440 transmits information 1442 to the sensor 1400. The information 1442 may be directly received from the external system or through the receiver device 1404 (or some other device in the vehicle 1401 such as a repeater). The weather sensor 1440 may sense temperature or precipitation conditions to mention two examples.

As mentioned, once the sensor 1400 detects information, the sensor 1400 proceeds to change its functionality. Changes to functionality may be accomplished in a number of different ways. In one example, variables or settings at the sensor 1400 may be changed (e.g., by modifying values in a memory location). In another example, new executable computer code may be uploaded to the sensor 1400, or existing executable code at the sensor 1400 may be enabled to be executed. In still other examples, devices, apparatuses and/or software code (e.g., software subroutines) at the sensor 1400 may be activated. In aspects, these physical or logical modifications cause the timing, power output, other functionality of the sensor to change or otherwise become adjusted. Other examples are possible.

In other aspects, another electronic device 1460 in the vehicle may also be configured according to the same external conditions as the sensor. In examples, the other device 1460 may be a speedometer or odometer. In one example, the various types of information described above are received by the device 1460 and the device 1460 changes its functionality in a similar way as the sensor changes functionality.

In another example, the TPM sensor 1400 informs or instructs the device 1460 using information 1462 to change functionality, and this occurs only when the sensor determines that a functionality change is warranted. Various types of information transmitted according to various communication formats can be used by the sensor to instruct the device 1460. In one particular example, the device 1460 is an odometer and changes from miles to kilometers when the sensor instructs the device 1460 that such a changes is needed (e.g., whenever, the vehicle has moved from a jurisdiction that uses miles to a jurisdiction that uses kilometers).

Figure 15:
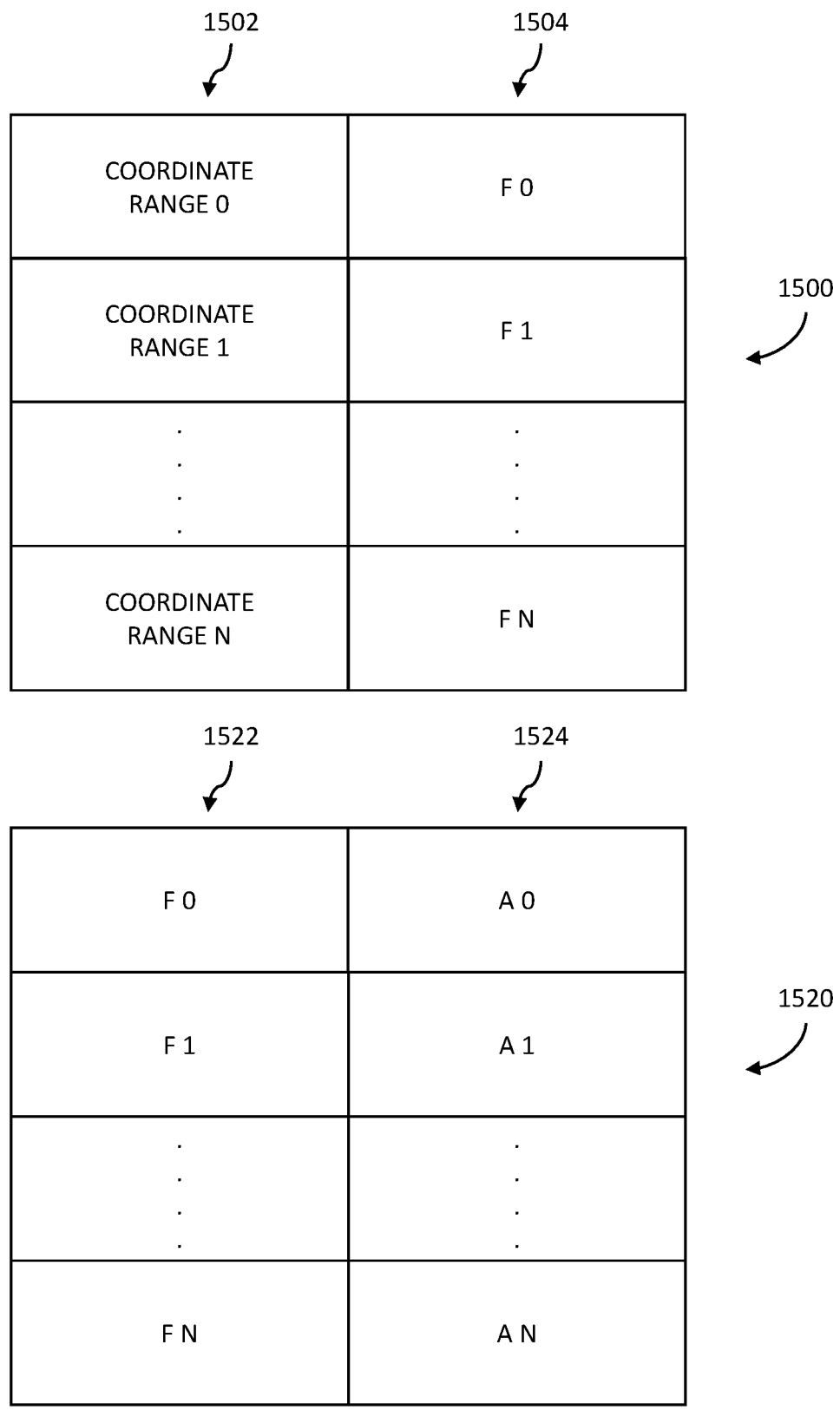
FIG. 15 comprises a data structure as configured in accordance with various embodiments of these teachings.

Referring now to FIG. 15, one example of how GPS coordinates (e.g., latitude and longitude) are mapped into functionality including the use of a specific memory structure. A look-up table 1500 has columns 1502 with longitude coordinate ranges and rows 1504 with latitude coordinate ranges. Each entry of the table is a functionality (F0 . . . FN). The functionalities may relate to settings of the TPM sensor, protocols to be transmitted by the TPM sensor, or other functionality (or combinations of various functionalities). As described herein, the functionality is physically implemented by, for example, activating software code (e.g., activating subroutines), setting (or re-setting) flags, uploading code or other instructions, or combinations of these (or other) actions to mention a few examples.

An action mapping data structure 1520 is also shown in FIG. 15. The data structure 1520 has a first column 1522 describing a functionality (F0 . . . FN) that maps to a second column 1524 describing a corresponding action (or actions) A0 . . . AN. As mentioned, the functionalities may relate to settings of the TPM sensor, protocols to be transmitted by the TPM sensor, or other functionality (or combinations of various functionalities). The actions are physically implemented by, for example, activating software code (e.g., activating subroutines), setting (or re-setting) flags, uploading code or other instructions, or combinations of these actions A0 . . . AN. For example, A0 may involve setting bits, A1 may be activating a first subroutine, A2 may be modifying code at the sensor, to mention a few examples.

It will be appreciated that other types of memory structures may be utilized to implement the determination of functionality from received information. However, the use of certain data structures (such as the above-described look-up tables or structures 1500 and 1520) offer advantages in that they allow data to be accessed more quickly and efficiently than other structures. In so doing, using the more efficient and faster-performing structures modifies underlying processor or control circuit operation to make the processor operate more quickly and efficiently than it would operate if using other approaches.

Figure 16:
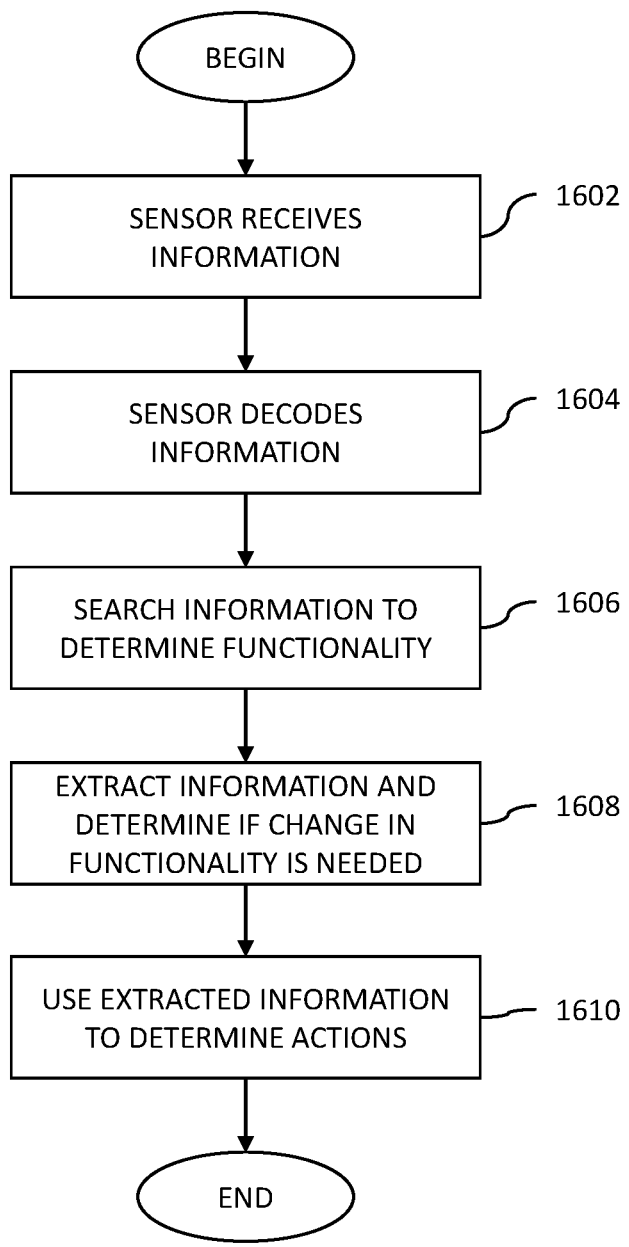
FIG. 16 comprises a flowchart as configured in accordance with various embodiments of these teachings.

Referring now to FIG. 16, one example of an approach for how the TPM sensor processes information is described. At step 1602, the sensor receives information. The received information may, in examples, be GPS coordinates, phone transmissions from a smartphone, or some other transmission from some other external source. At step 1604, the sensor decodes the received information. Decoding may include decrypting the received information by determining a pattern to the received information. For example, received GPS transmissions may include headers, bit patterns, byte patterns, or other identifiers in the transmission that can be used to ascertain that the transmission is a GPS transmission. Once the header is located, then GPS coordinate information may follow in the transmission.

At step 1606, the identified information is searched to find the information that will determine functionality. For example and as mentioned once a header has been found identifying the transmission as from a GPS source, the underlying GPS coordinate information is determined. For instance, latitude and longitude coordinates may be located.

At step 1608, the identified information is extracted and a determination is made as to whether a change in functionality is needed. For example, geographic coordinate information may be extracted and if the geographic coordinates have changed from being in one jurisdiction to being in another jurisdiction, then the functionality may be changed. If no functionality change is deemed to be needed, execution ends. However, if a functionality change is deemed to be needed, control continues with step 1610.

At step 1610, the extracted information is selectively used (e.g., using the data structure 1500 of FIG. 15) to map the information into functionality (e.g., F0 . . . FN). At step 1612, the functionality is mapped into actions (e.g., using the data structure 1520 of FIG. 15). Operation then ends.

Figure 17:
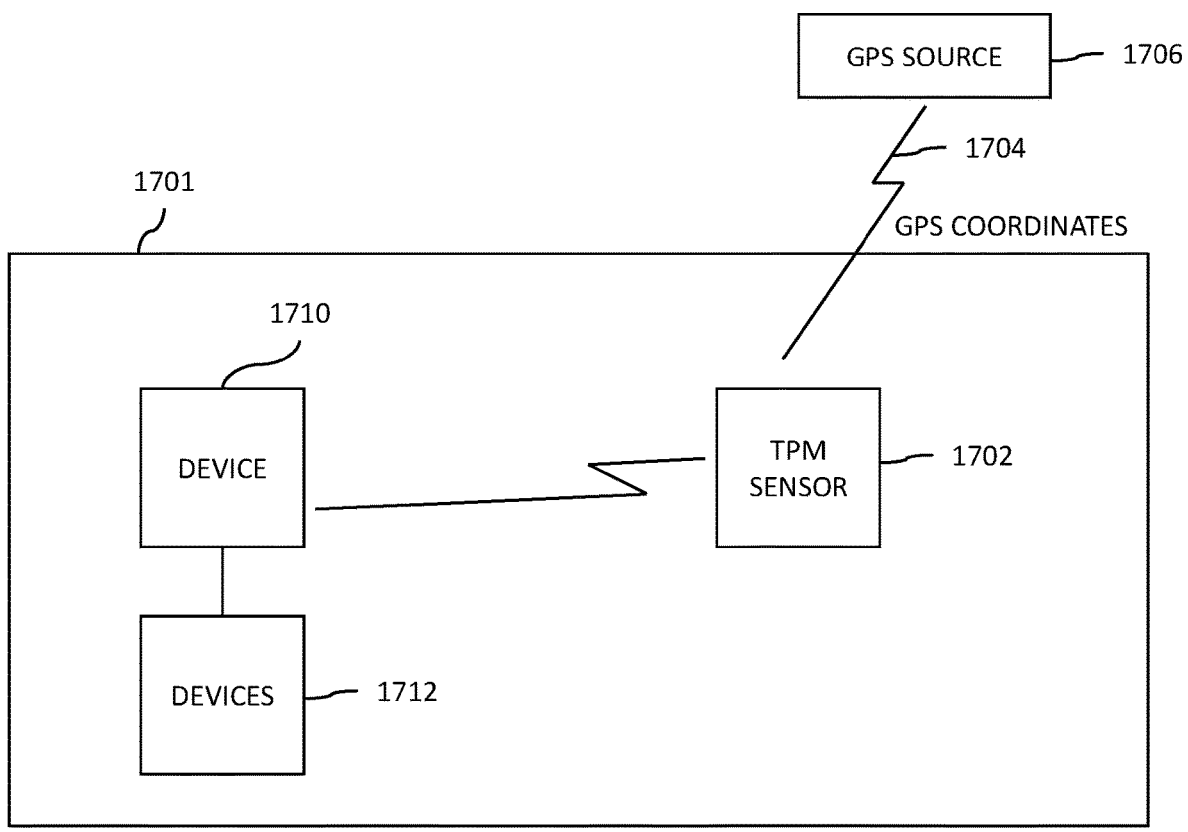
FIG. 17 comprises a diagram of an apparatus as configured in accordance with various embodiments of these teachings.

Referring now to FIG. 17, one example of how a TPS sensor may be used to control other devices in a vehicle 1701 is described. In this example, once the TPM sensor determines a functionality modification, then it can send it to the other devices. In other examples, the other devices may receive it directly.

In the example of FIG. 17, a TPM sensor 1702 receives GPS coordinate information 1704 from a GPS source 1706 (e.g., a GPS tracking or location service that may include a GPS satellite). The sensor 1702 determines that it is located at a particular location and changes its functionality. Once this determination has been made, the sensor 1702 forms a message 1708 the is transmitted at an appropriate frequency and/or transmission protocol (e.g., Bluetooth, BLE, or RF) to another device 1710.

The device 1710 may be a device such as a speedometer or odometer that potentially changes functionality based on the GPS coordinate information. Thus, the speedometer or odometer may change from displaying miles to displaying kilometers when it moves from a first jurisdiction to a second jurisdiction.

In this case, the TPM sensor 1702 acts as a master controller that controls (or potentially controls) the operation of other devices in the vehicle. In other examples, the other devices may communicate with still other devices 1712 (e.g., when it would be more convenient or practical to rely on this communication rather than on direct communication between the TPM sensor 1702 and the other devices 1712).

In other examples, the device 1710 directly receives the information from the external source 1706. In this case, the device 1710 may determine whether to change its functionality.

Figure 18:
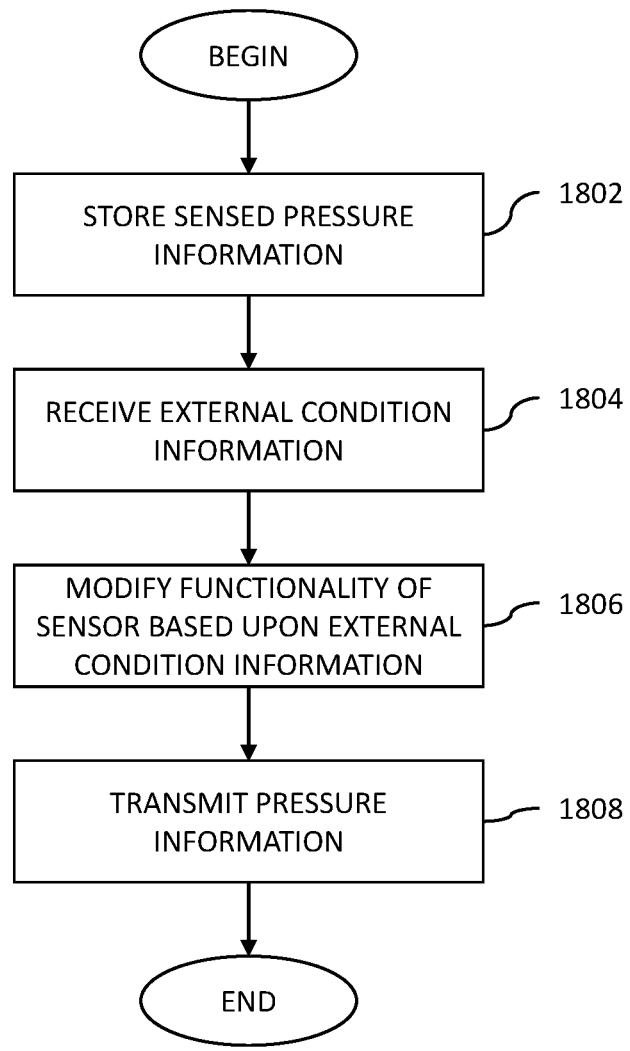
FIG. 18 comprises a flowchart as configured in accordance with various embodiments of these teachings.

Referring now to FIG. 18, one example of operating a TPM sensor is described. At step 1802, sensed pressure information from the sensor is stored at a transmission buffer of the sensor.

At step 1804, external condition information is received at a receiver circuit of the sensor. In aspects, the external condition information may be GPS coordinates or weather information to mention two examples.

At step 1806, a control circuit of the sensor is configured to modify the functionality of the sensor according to the received external condition information. In examples, the functionality may include the protocols being used for transmissions or operating characteristics of the sensor.

At step 1808, the control circuit causes the sensed pressure information to be transmitted from the transmission buffer according to one or more protocols. Each of the one or more protocols is associated with a vehicle manufacturer.

Figure 19:
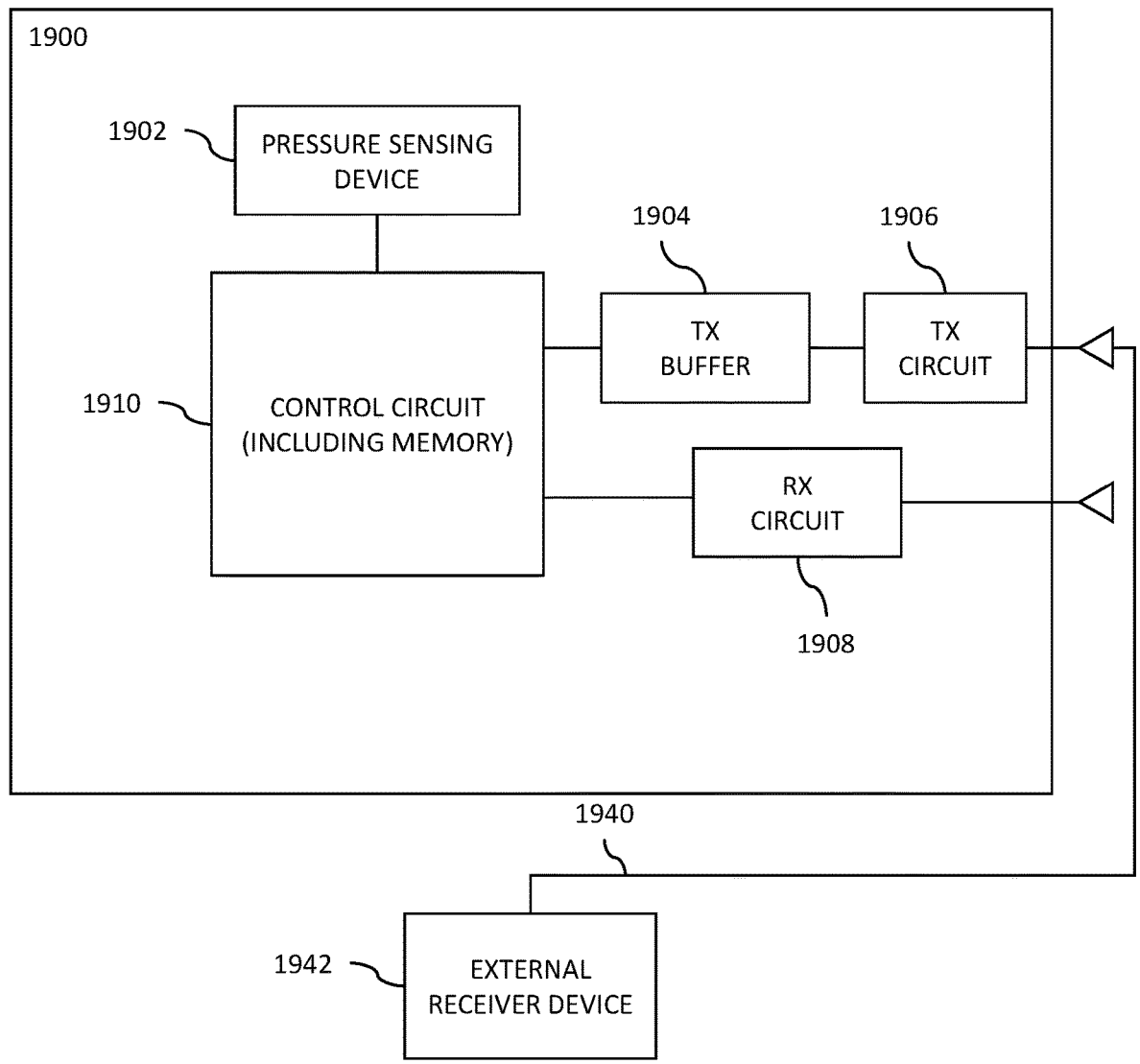
FIG. 19 comprises a diagram of an apparatus as configured in accordance with various embodiments of these teachings.

Referring now to FIG. 19, one example of a TPM sensor 1900 is described. The sensor 1900 includes a pressure sensing device 1902, a transmission buffer 1904, a transmitter circuit 1906, a receiver circuit 1908, and a control circuit 1910.

The pressure sensing device 1902 is configured to sense pressure information of a tire. The pressure sensing device 1902 is any mechanical or electrical sensing arrangement, device, or apparatus that senses the pressure of the tire as known to those skilled in the art.

The transmission buffer 1904 is coupled to the sensing device 1902 and the transmitter circuit 1906. The transmission buffer 1904 is an electronic memory storage device that is utilized to store the sensed pressure information.

The transmitter circuit 1906 is configured to transmit a signal including the tire pressure monitoring data. The signal includes a burst that includes one or more frames and each of the frames includes the tire pressure monitoring information. In aspects, a plurality of pause spaces in some examples are disposed between at least some of the frames in the burst. Characteristics of the frames in the burst may be selected based upon criteria such as government standards, industry requirements, periodicity requirements, or power requirements. Other examples of criteria are possible.

The characteristics of the signal (e.g., that are adjusted to meet government standards, industry requirements, receiver requirements, periodicity requirements, and/or power requirements) may include the total number of frames in the burst, the relative positioning of the frames within the burst, the number of frames in the burst from each of plurality of manufacturers, and the relative positioning of the frames within the burst wherein at least some of the frames are from different manufacturers. Other examples are possible.

The transmitter circuit 1906 may include one or more antennas to transmit the signals. As mentioned, one or more antennas receive other communications (e.g., LF communications) that activate the sensor 1900 transmit the RF signals. The transmitter circuit 206 may include other functionality such as conversion from one electronic format to another electronic format (e.g., digital to analog or vice versa).

The receiver circuit 1908 is configured to receive external condition information. The receiver circuit 1908 may share the antennas of the transmitter circuit 1906. The receiver circuit 1908 may include other functionality such as conversion from one electronic format to another electronic format (e.g., digital to analog or vice versa). In other aspects, the receiver circuit 1908 and the transmitter circuit 1906 may integrated into a single transceiver circuit.

The control circuit 1910 is coupled to the pressure sensing device 1902, the receiver circuit 1908, and the transmitter circuit 1906. The term "control circuit" refers broadly to any one (or more) microcontrollers, computers, or processor-based devices with processors, memories, and programmable input/output peripherals, which are generally designed to govern the operation of other components and devices. It is further understood to include common accompanying accessory devices, including memory, transceivers for communication with other components and devices, etc. These architectural options are well known and understood in the art and require no further description here. The control circuit 1910 may be configured (for example, by using corresponding programming stored in a memory as will be well understood by those skilled in the art) to carry out one or more of the steps, actions, and/or functions described herein.

The control circuit 1910 is configured to cause the transmitter circuit 1908 to transmit the identifier from the transmission buffer 1904 to an external receiver device. The external receiver device is configured to receive the identifier and to determine sensor functionality information associated with the identifier. The external receiver device is configured to transmit the sensor functionality information to the TPM sensor 1900.

The receiver circuit 1908 is coupled to the control circuit 1910 and is configured to receive the sensor functionality information. The control circuit 1910 is configured to configure the operation of the TPM sensor 1900 according to the sensor functionality information.

In aspects, the sensor functionality information defines a single protocol (or set of protocols) that is to be used by the TPM sensor 1900 for transmissions of the sensed pressure information. In examples, the control circuit 1910 causes the transmitter circuit 2006 to transmit the sensed pressure information from the transmission buffer 2004 according to the single protocol (or multiple protocols).

In other examples, the sensor functionality information relates to non-transmission-protocol functionality associated with the TPM sensor 1900. In still other aspects, the sensor functionality information relates to updates to the functionality of the TPM sensor 1900. For example, updates can first be loaded to the external receiver device and then pushed out, e.g., periodically, to the sensors. In yet other examples, the sensor functionality information comprises computer code that implements the functionality. In some other examples, the sensor functionality information comprises electronic instructions.

In one aspect, identifier information 1940 is transmitted from the sensor 1900 via the transmission buffer 1904 and the transmitter circuit 1906 to an external receiver device 1942 deployed in a vehicle. The receiver device 1942 obtains functionality information for the sensor 1900 and transmits this functionality back to the sensor 1900 to configure the sensor 1900.

Figure 20:
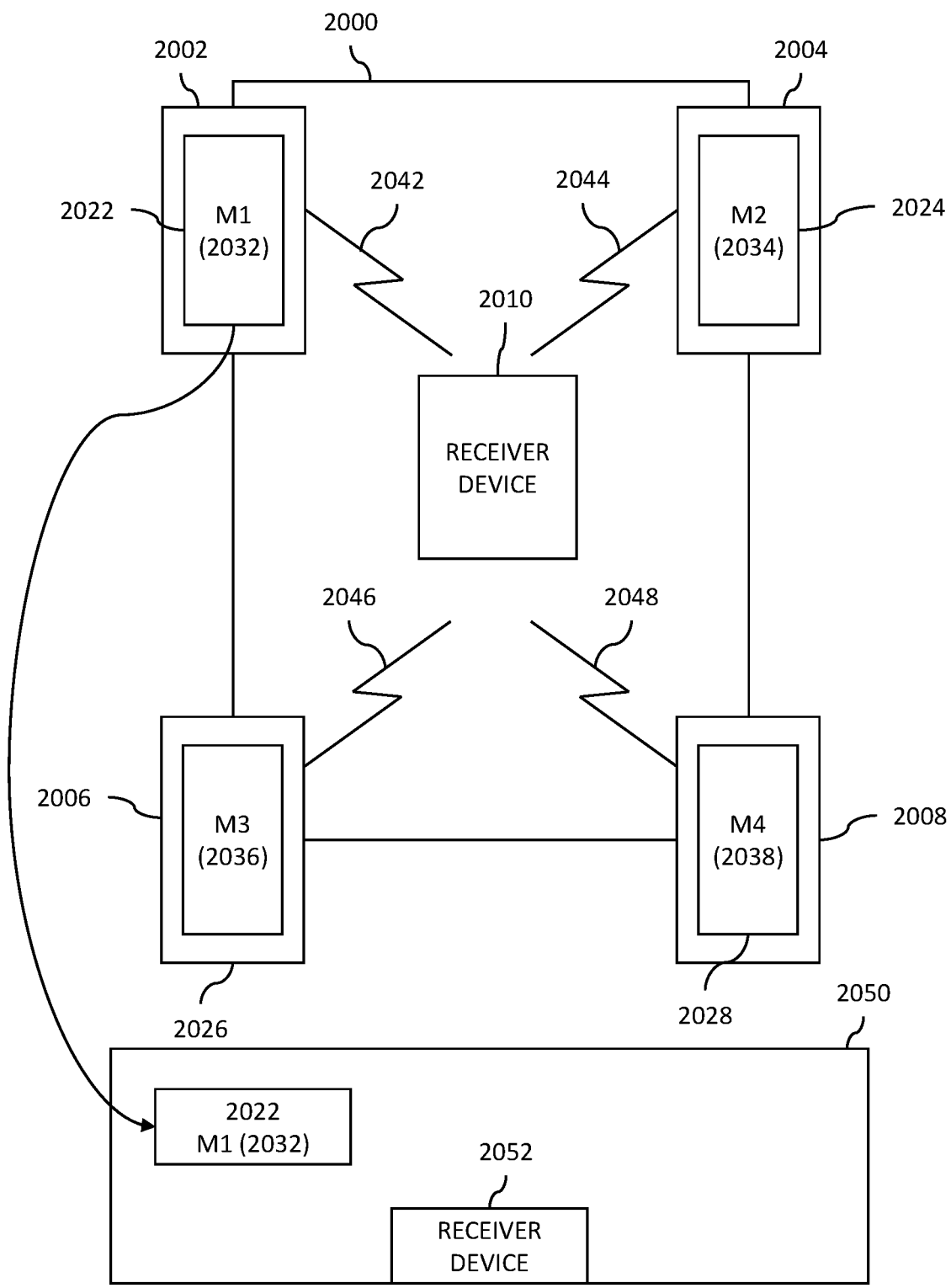
FIG. 20 comprises a diagram of an apparatus as configured in accordance with various embodiments of these teachings.

Referring now to FIG. 20, one example of utilizing the present approaches is described. A vehicle 2000 includes four tires 2002, 2004, 2006, and 2008. Each of the tires has a corresponding tire pressure monitoring (TPM) sensor 2022, 2024, 2026, and 2028. The vehicle 2000 also includes a receiver device 2010.

The receiver device 2010 is configured as described with respect to the receiver devices described with respect to FIG. 1 and FIG. 19. In these regards, the receiver device 2010 may include an antenna and transceiver circuit to transmit and receive communications from the sensors 2022, 2024, 2026, and 2028. Separate from control circuits in the sensors 2022, 2024, 2026, and 2028, the receiver device 2010 may also include a control circuit that analyzes identifiers sent from the sensors 2022, 2024, 2026, and 2028, and maps (e.g., using a mapping data structure stored in a memory at the receiver device 2010) to functionality information. As described herein, functionality information may include parameters, computer code, and/or computer instructions that affect and/or control one or more aspects of the operation of the TPM sensors 2022, 2024, 2026, and 2028. In examples, the functionality information may be actual computer code, electronic instructions (e.g., instructions to flip a bit at the sensor), or both. The code or instructions are effective to control, change, alter, and/or set the functionality (aspects of operation) of the sensors. Functionality might include in examples: starting transmission in the future when change in pressure is greater than a threshold, controlling the transmission protocol of the sensor to use a particular format (e.g., 0.2 psi/bit), or instruction the sensor to use a particular transmission protocol of a particular sensor. Other examples are possible.

In other aspects, a function of the receiver device 2010 is to receive pressures (or other information such as temperature) from the sensors 2022, 2024, 2026, and 2028 and in appropriate circumstances (e.g., the pressure falling below a level) alert the driver or other occupant of the vehicle 2000. In these regards, the receiver device 2010 typically has a display (or some sort of user interface) that is configured to alert the driver when the tire pressure falls below a predetermined threshold value. Once physically installed in the tire, the devices 2022, 2024, 2026, and 2028 are first "learned" by the control unit. During this process, the receiver device 2010 determines the particular identifiers and during or after learning, a localization process may be executed in which each of the sensors 2022, 2024, 2026, and 2028 is associated with a particular tire.

During normal operation (after the sensors are learned and localized and the vehicle is moving), the sensors 2022, 2024, 2026, and 2028 sense the tire pressure and sends a radio frequency (RF) signal to the receiver device 2010 indicating the tire pressure. The receiver device 2010 can then determine if a pressure problem exists. If a problem exists, the user can be alerted so that appropriate action can be taken.

The vehicle 2000 may be any type of vehicle such as a passenger car or truck. The TPM sensors 2022, 2024, 2026, and 2028 may include pressure sensing devices that obtain the pressures of the corresponding tires 2002, 2004, 2006, and 2008. In other respects, the TPM sensors 2022, 2024, 2026, and 2028 may be the same or similar in structure and functionality to the sensors described above with respect to FIG. 1 and FIG. 19.

The sensor 2022 is associated with a first identifier 2032 (e.g., a media access control (MAC) identifier (ID) M1). The sensor 2024 is associated with a second identifier 2034 (e.g., a MAC ID M2). The sensor 2026 is associated with a third identifier 2036 (e.g., a MAC ID M3). The sensor 2028 is associated with a fourth identifier 2038 (e.g., a MAC ID M4). The identifiers 2032, 2034, 2036, and 2038 may be stored in corresponding memories (permanent and/or temporary) of their corresponding sensor. Each of the sensors 2022, 2024, 2026, and 2028 makes a transmission to the receiver device 2110. These transmissions are labeled as 2042, 2044, 2046, and 2048 in FIG. 20. The transmissions 2042, 2044, 2046, and 2048 are received at the receiver device 2010.

The receiver device 2010 receives these transmissions. The receiver device 2010 maps the identifiers 2032, 2034, 2036, and 2038 to functionality information needed for these identifiers. Once the functionality information is identified, obtained, and/or retrieved, the receiver device 2010 transmits the functionality information (e.g., code, electronic instructions or both) to the sensors 2022, 2024, 2026, and 2028 to set the functionality of the sensors 2022, 2024, 2026, and 2028. The functionality information transmitted may be the same for all the sensors 2022, 2024, 2026, and 2028 or may be different.

In some aspects, these operations may be performed every time the vehicle 2000 is put into motion (after it has been at rest for a predetermined period of time). In other aspects, these operations are performed once.

In one case, the sensors 2022, 2024, 2026, and 2028 are placed in the tires of vehicle. The driver starts driving the vehicle. Sensors 2022, 2024, 2026, and 2028 start transmitting their identifiers. The receiver device 2010 receives the identifiers M1, M2, M3, and M4 and information that the correct centripetal acceleration has been received (from an accelerometer). The receiver device 2010 maps M1, M2, M3, and M4 to specific functionality information and makes the transmissions with the functionality information to the appropriate sensors. Once identified, the functionality information is retrieved or obtained (e.g., the functionality information may be or indicate specific computer code and the code is retrieved from memory).

In another example, a sensor can lock onto (utilize) these settings until no motion is detected. The sensor may later transmit its MAC address. But, the receiver device 2010 may realize it already programmed the sensors so there will be no transfer of functionality information.

In another case, a sensor (e.g., sensor 2022) is removed from the vehicle and put on another vehicle 2050 having a second receiver 2052. The second receiver 2052 sees the new sensor 2022 (e.g., from detecting transmissions from the new sensor).

The second receiver 2052 downloads functionality to the new sensor. In aspects, the second receiver 2052 instructs the other sensors on the vehicle 2050 to keep their current protocols and configurations.

In aspects, it will be appreciated that in the approaches described herein TPM sensors are not independently aware of (e.g., programmed at manufacturing to recognize) the protocols they should use to transmit sensed pressure (or other types of) information. For instance, a sensor installed in a vehicle manufactured by a first manufacturer, is not programmed at manufacturing to know that it should transmit according a protocol utilized by the first manufacturer. In fact, according to aspects of the approaches provided herein, the TPM sensors transmit information and are configured based upon actions taken by devices (e.g., receiver devices) in the vehicle.

It will be appreciated that the approaches described herein could be used for updates. In aspects, the vehicle (e.g., via receiver devices in the vehicle) can update functionality over time. This new functionality is received and may indicate that updates are appropriate for sensors having certain ID ranges or sensors that are operating with a particular vehicle. So, new functionality can be pushed down to the new sensors. In other aspects, certain types of sensors within a vehicle will have different functionality, so the update need not be to all sensors on the vehicle.

Figure 21:
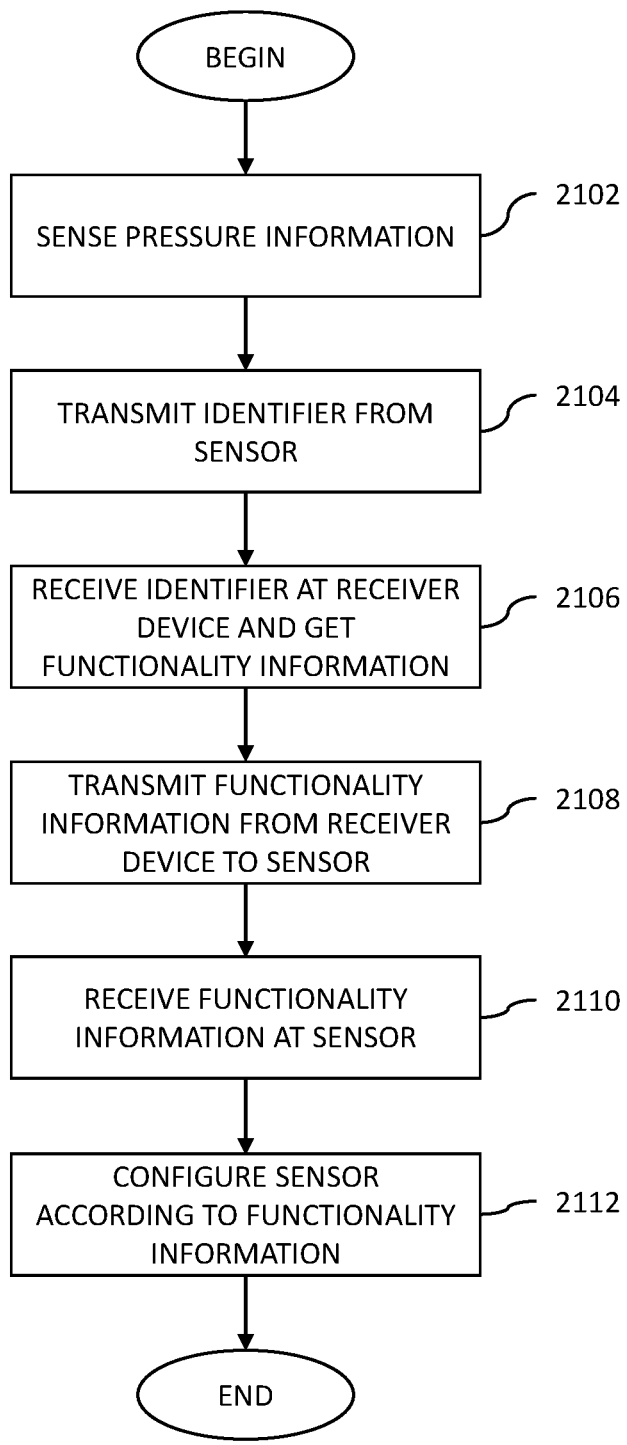
FIG. 21 comprises a flowchart as configured in accordance with various embodiments of these teachings.

Referring now to FIG. 21, one example of operating a tire pressure monitoring (TPM) sensor is described. At step 2102, pressure information of a tire is sensed at a pressure sensing device. The sensed pressure information and an identifier that uniquely identifies the TPM sensor are stored at a transmission buffer.

At step 2104, a control circuit of the sensor causes a transmitter circuit to transmit the identifier from the transmission buffer to an external receiver device. The control circuit may also cause the transmission of the sensed pressure information.

At step 2106, an external receiver device is configured to receive the identifier and determine sensor functionality information associated with the identifier. The external receiver device is deployed within the vehicle and may identify its type as being of a particular vehicle manufacturer. In examples, the external receiver device has a mapping table that maps identifiers to functionality. A first column of the table may have ranges of identifiers, while a second column may identify functionality (e.g., identify, include, or point to electronic instructions, computer code, or variable settings to mention a few examples).

At step 2108, the external receiver device is configured to subsequently transmit the sensor functionality information to the TPM sensor. At step 2110, the sensor functionality information is received at a receiver circuit of the sensor.

At step 2112, the control circuit of the sensor is configured to configure the operation of the TPM sensor according to the received senor functionality information. In aspects, the functionality information physically transforms the operation of the TPM sensor.

Figure 22:
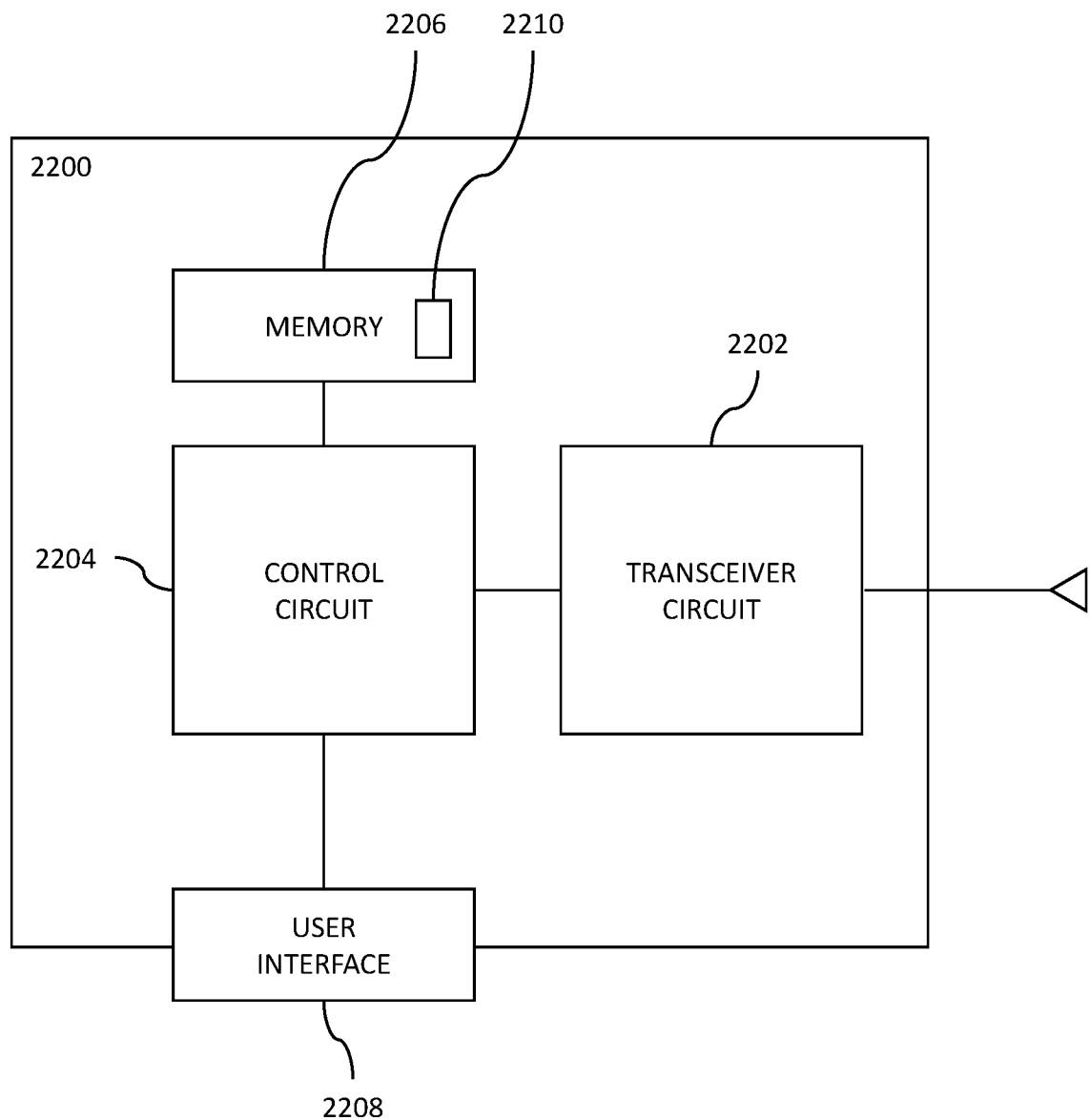
FIG. 22 comprises a diagram of an apparatus as configured in accordance with various embodiments of these teachings.

Referring now to FIG. 22, one example of an external receiver device 2200 is described. The external receiver device 2200 includes a transceiver circuit 2202, a control circuit 2204, a memory or database 2206, and a user interface 2208.

The transceiver 2202 includes electronic circuitry and/or computer software that transmits and receives transmissions to and from TPM sensors. The transceiver circuit 2202 also includes at least one antenna. In aspects, the transceiver circuit 2202 may include separate transmitter and receiver circuits.

The control circuit 2204 is any type of electronic processing device that executes computer instructions as has been described elsewhere herein. The memory or database 2206 is any type of electronic memory device. The user interface 2208, in examples, may display pressure information, alerts, and warnings to a driver or other occupant of a vehicle.

The control circuit 2204 receives identifiers from sensors and determines sensor functionality information associated with the identifiers. The memory 2206 has a mapping table that maps identifiers to functionality. A first column of the table 2210 may have ranges of identifiers, while a second column may identify functionality (e.g., identify, include, or point to electronic instructions, computer code, or variable settings to mention a few examples). The actual instructions, code, or settings may be in the table 2210, may be stored elsewhere in the memory 2206, or may be obtained from some other source.

The control circuit 2204 is configured to subsequently transmit the sensor functionality information to the sensors via the transceiver circuit 2202. The sensors may then configure themselves according to the received functionality information.

Figure 23:
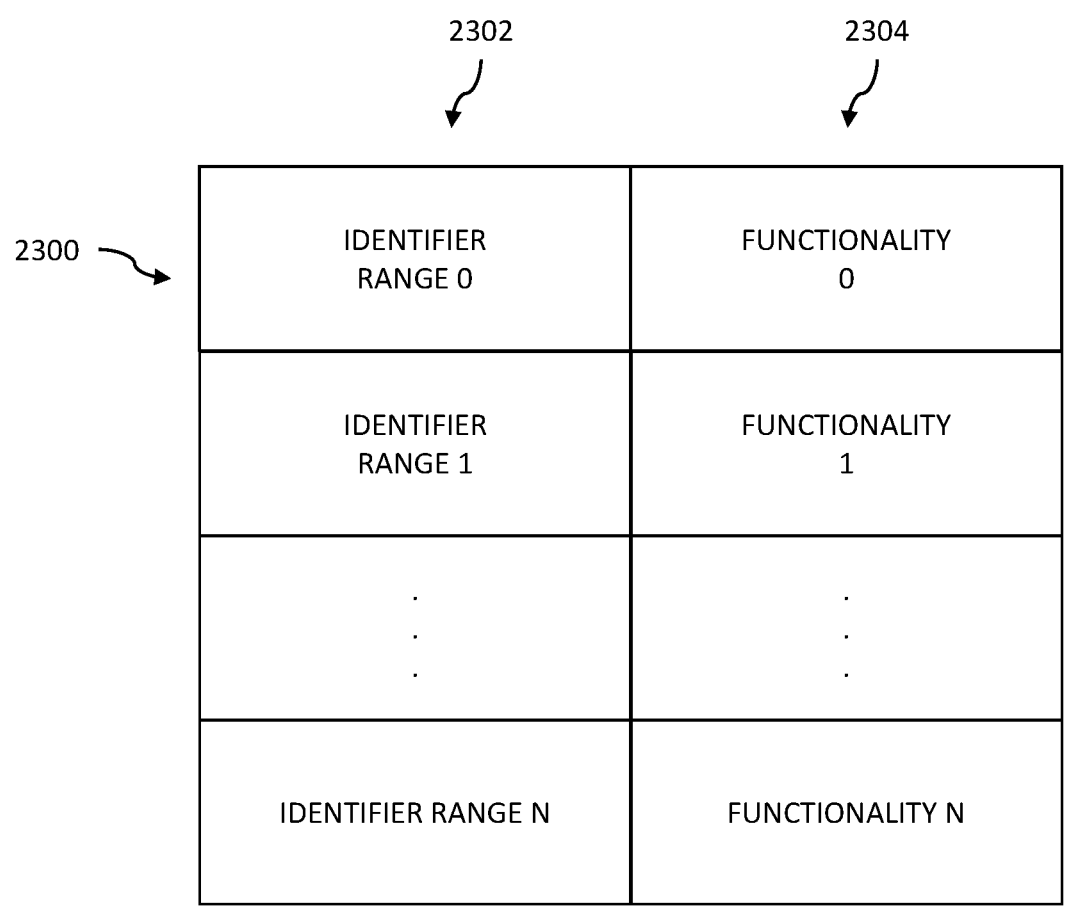
FIG. 23 comprises a data structure as configured in accordance with various embodiments of these teachings.

Referring now to FIG. 23, one example of a mapping table 2300 is described. The table 2300 may be stored at a memory of the receiver devices described herein. The mapping table 2300 has a first column 2302 and a second column 2304. The first column has identifier (e.g., address) ranges and the second column 2304 has functionality information. In aspects, the functionality information may identify, include, or point to electronic instructions, computer code, or variable settings. In other aspects, the functionality information may itself be stored in the table and can be electronic instructions, computer code, or variable settings to mention a few examples.

It should be understood that any of the devices described herein (e.g., the programming or activation devices, the tire pressure monitoring devices, the receiver circuits, the transmitter circuits, the sensors, the presentation devices, or the external devices) may use a computing device to implement various functionality and operation of these devices. In terms of hardware architecture, such a computing device can include but is not limited to a control circuit, processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this disclosure are described herein, including the best mode known to the inventor(s). It should be understood that the illustrated embodiments are exemplary only and should not be taken as limiting the scope of the appended claims.

What is claimed is:

1. A tire pressure monitoring (TPM) sensor of a vehicle, the sensor comprising:
   a sensing device that is configured to sense pressure information of a tire;
   a transmission buffer coupled to the sensing device, the transmission buffer utilized to store the sensed pressure information;
   a transmitter circuit coupled to the transmission buffer;
   a receiver circuit that is configured to receive acceleration or motion information from an accelerometer, the receiver circuit also configured to receive sensed burst patterns from other tire pressure monitoring sensors of the vehicle;
   a control circuit that is coupled to the pressure sensing device, the transmitter circuit, and the receiver circuit, the control circuit configured to cause the transmission of a first burst pattern from the transmission buffer to an external receiver device via the transmitter circuit, the first burst pattern comprising the sensed tire pressure information according to a plurality of communication formats for a plurality of vehicle manufacturers;
   wherein the control circuit is configured to perform a first analysis on the received acceleration or motion information and when the first analysis indicates that motion or acceleration is detected, perform a second analysis on the detected burst patterns from the other tire pressure monitoring sensors of the vehicle that are received by the receiver circuit,
   wherein the control circuit is configured to, based upon the second analysis of the detected burst patterns from the other tire pressure monitoring sensors of the vehicle, selectively alter the first burst pattern to a single communication format for a single vehicle manufacturer, and cause the transmitter circuit to transmit the pressure information in the transmission buffer according to the single communication format.

2. The TPM sensor of claim 1, wherein the pressure information is the measured pressure of the tire.

3. The TPM sensor of claim 1, wherein the sensing device further detects temperature information concerning the tire.

4. The TPM sensor of claim 1, wherein the detected burst patterns from the other tire pressure monitoring sensors of the vehicle comprise three burst patterns, each of the three burst patterns being of the same communication format.

5. The TPM sensor of claim 1, wherein the detected burst patterns from the other tire pressure monitoring sensors of the vehicle comprise one burst pattern of a single communication format and two burst patterns each having multiple communication formats.

6. The TPM sensor of claim 1, wherein the detected burst patterns include at least one burst pattern having the single communication format, and the alteration of the first burst pattern is made based upon a probability that the single communication format is correct.

7. The TPM sensor of claim 1, wherein the sensor is moved from the tire of a first vehicle to a tire of a second vehicle and the detected burst patterns from the other tire pressure monitoring sensors of the vehicle are from sensors on the second vehicle.

8. A method of operating a tire pressure monitoring (TPM) sensor of a vehicle, the method comprising:
   sensing pressure information of a tire at a sensing device;
   storing the sensed pressure information in transmission buffer;
   at a receiver circuit, receiving acceleration or motion information from an accelerometer and receiving sensed burst patterns from other tire pressure monitoring sensors of the vehicle;
   at a control circuit, causing transmission of a first burst pattern from the transmission buffer to an external receiver device via the transmitter circuit, the first burst pattern comprising the sensed tire pressure information according to a plurality of communication formats for a plurality of vehicle manufacturers;
   at the control circuit, analyzing the received acceleration or motion information and when the analyzing indicates that motion or acceleration is detected, analyzing the detected burst patterns from the other tire pressure monitoring sensors of the vehicle that are received by the receiver circuit;

at the control circuit and based upon analyzing the detected burst patterns from the other tire pressure monitoring sensors of the vehicle, selectively altering the first burst pattern to a single communication format for a single vehicle manufacturer, and causing the transmitter circuit to transmit the pressure information in the transmission buffer according to the single communication format.

9. The method of claim 8, wherein the pressure information is the measured pressure of the tire.

10. The method of claim 8, further comprising detecting temperature information concerning the tire by the sensing device.

11. The method of claim 8, wherein the detected burst patterns from the other tire pressure monitoring sensors of the vehicle comprise three burst patterns, each of the three burst patterns being of the same communication format.

12. The method of claim 8, wherein the detected burst patterns from the other tire pressure monitoring sensors of the vehicle comprise one burst pattern of a single communication format and two burst patterns each having multiple communication formats.

13. The method of claim 8, wherein the detected burst patterns include at least one burst pattern having the single communication format, and the alteration of the first burst pattern is made based upon a probability that the single communication format is correct.

14. The method of claim 8, further comprising moving the TPM sensor from the tire of a first vehicle to a tire of a second vehicle.

15. A computer readable non-transitory medium having a computer readable program code embodied therein, the computer readable program code adapted to be executed to implement a method of operating a tire pressure monitoring system of a vehicle, the method comprising:

sensing pressure information of a tire at a sensing device;

storing the sensed pressure information in transmission buffer;

at a receiver circuit, receiving acceleration or motion information from an accelerometer and receiving sensed burst patterns from other tire pressure monitoring sensors of the vehicle;

at a control circuit, causing transmission of a first burst pattern from the transmission buffer to an external receiver device via the transmitter circuit, the first burst pattern comprising the sensed tire pressure information according to a plurality of communication formats for a plurality of vehicle manufacturers;

at the control circuit, analyzing the received acceleration or motion information and when the analyzing indicates that motion or acceleration is detected, analyzing the detected burst patterns from the other tire pressure monitoring sensors of the vehicle that are received by the receiver circuit;

at the control circuit and based upon an analysis of the detected burst patterns from the other tire pressure monitoring sensors of the vehicle, selectively altering the first burst pattern to a single communication format for a single vehicle manufacturer, and causing the transmitter circuit to transmit the pressure information in the transmission buffer according to the single communication format.

16. The computer readable non-transitory medium of claim 15, wherein the pressure information is the measured pressure of the tire.

17. The computer readable non-transitory medium of claim 15, wherein the method further comprises detecting temperature information concerning the tire by the sensing device.

18. The computer readable non-transitory medium of claim 15, wherein the detected burst patterns from the other tire pressure monitoring sensors of the vehicle comprise three burst patterns, each of the three burst patterns being of the same communication format.

19. The computer readable non-transitory medium of claim 15, wherein the detected burst patterns from the other tire pressure monitoring sensors of the vehicle comprise one burst pattern of a single communication format and two burst patterns each having multiple communication formats.

20. The computer readable non-transitory medium of claim 15, wherein the detected burst patterns include at least one burst pattern having the single communication format, and the alteration of the first burst pattern is made based upon a probability that the single communication format is correct.

* * * * *